US009780858B2

(12) United States Patent
Li

(10) Patent No.: US 9,780,858 B2
(45) Date of Patent: Oct. 3, 2017

(54) METHOD AND APPARATUS FOR DETERMINING THREE-DIMENSIONAL BEAM PRE-CODING INFORMATION

(71) Applicant: China Academy of Telecommunications Technology, Beijing (CN)

(72) Inventor: Hui Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/328,489

(22) PCT Filed: Jul. 17, 2015

(86) PCT No.: PCT/CN2015/084318
§ 371 (c)(1),
(2) Date: Jan. 24, 2017

(87) PCT Pub. No.: WO2016/015568
PCT Pub. Date: Feb. 4, 2016

(65) Prior Publication Data
US 2017/0214447 A1     Jul. 27, 2017

(30) Foreign Application Priority Data

Aug. 1, 2014   (CN) .......................... 2014 1 0377800

(51) Int. Cl.
*H04W 72/00*     (2009.01)
*H04B 7/06*      (2006.01)
(Continued)

(52) U.S. Cl.
CPC ......... *H04B 7/0617* (2013.01); *H04B 7/0626* (2013.01); *H04B 17/327* (2015.01); *H04L 5/0048* (2013.01); *H04W 24/02* (2013.01)

(58) Field of Classification Search
CPC ..... H04W 24/00; H04W 16/10; H04W 16/24; H04W 16/28; H04W 72/082;
(Continued)

(56) References Cited

U.S. PATENT DOCUMENTS

2009/0253380 A1* 10/2009 Ko .......................... H04B 7/043
455/68
2010/0284495 A1* 11/2010 Segal ..................... H04B 7/086
375/316
(Continued)

FOREIGN PATENT DOCUMENTS

CN          102412885 A      4/2012
CN          103684657 A      3/2014
(Continued)

*Primary Examiner* — Temica M Beamer
(74) *Attorney, Agent, or Firm* — Kilpatrick Townsend & Stockton LLP

(57) ABSTRACT

The embodiments of the present invention relate to the field of wireless communications, and more particularly, to a method and apparatus for determining three-dimensional beam pre-coding information so as to perform three-dimensional beam forming. In the embodiments of the present invention, a network device first determines a first optimal beam forming vector, and then determines a second optimal beam forming vector from a second beam forming vector set corresponding to the first optimal beam forming vector and performs channel measurement via a formed pilot to determine optimal pre-coding information about a second dimension. Since an optimal beam forming vector therein is determined based on a beam forming vector set with a coarse particle granularity, and then an optimal beam forming vector therein is determined based on a corresponding beam forming vector set with a fine particle granularity, the purpose of determining the optimal beam forming vector with fine particle granularity and the optimal pre-coding information is achieved, which, compared with the prior art,
(Continued)

reduces system resource expense, and further reduces the complexity of a user equipment.

18 Claims, 8 Drawing Sheets

(51) Int. Cl.
  *H04L 5/00* (2006.01)
  *H04W 24/02* (2009.01)
  *H04B 17/327* (2015.01)
(58) Field of Classification Search
  CPC ..... H04W 72/04; H04W 28/04; H04W 88/05; H04W 88/085
  USPC .................................. 455/452.1, 561, 562.1
  See application file for complete search history.

(56) References Cited

U.S. PATENT DOCUMENTS

| 2012/0178501 A1* | 7/2012 | Jiang .................... H04B 1/7085 |
| | | 455/561 |
| 2013/0235742 A1 | 9/2013 | Josiam et al. |
| 2017/0054481 A1* | 2/2017 | Dinan .................. H04B 7/0456 |

FOREIGN PATENT DOCUMENTS

| CN | 103780331 A | 5/2014 |
| CN | 103795489 A | 5/2014 |
| WO | 2014079329 A1 | 5/2014 |

\* cited by examiner

METHOD AND APPARATUS FOR DETERMINING THREE-DIMENSIONAL BEAM PRE-CODING INFORMATION

This application is a US National Stage of International Application No. PCT/CN2015/084318, filed on Jul. 17, 2015, designating the United States, and claiming the benefit of Chinese Patent Application No. 201410377800.5, filed with the Chinese Patent Office on Aug. 1, 2014 and entitled "Method and apparatus for determining three-dimension beam pre-coding information", which is hereby incorporated by reference in its entirety.

FIELD

The present invention relates to the field of wireless communications, and particularly to a method and apparatus for determining three-dimension beam pre-coding information.

BACKGROUND

In an existing cellular system, an array of base station antennas is generally arranged horizontally. A beam of a base station transmitter can only be adjusted horizontally, but may be inclined vertically at a fixed angle for each User Equipment (UE), so various beam-forming/pre-coding and other technologies are generally applicable to horizontal channels. Since a radio signal is propagated in the three-dimension space, and the performance of the system may not be made optimum due to the fixed downward inclination angle, it is of great significance for the performance of the system to be improved by adjusting the beam vertically. As the radio technologies are developing, such an array of active antennas has emerged in the industry that each array element can be controlled separately. This array of antennas makes it possible to dynamically adjust the beam vertically.

There is such an existing solution to three-dimension beam-forming that a base station deploys a plurality of Channel State Information-Reference Signal (CSI-RS) resources in the horizontal dimension, and the base station applies different vertical beam-forming vectors to the respective CSI-RS resources for beam-forming, and transmits CSI-RS signals over the respective CSI-RS resources. A user equipment measures each CSI-RS signal set in the horizontal dimension, and reports Channel State Information (CSI), and the base station determines three-dimension beam pre-coding information based upon the feedback of the user equipment.

With the solution above, there may be both a significant resource overhead of the system, and high complexity of the user equipment.

SUMMARY

Embodiments of the invention provide a method and apparatus for determining three-dimension beam pre-coding information so as to enable three-dimension beam-forming.

An embodiment of the invention provides a method for determining three-dimension beam pre-coding information, the method including:

performing, by a network device, beam-forming on pilot resources using vectors in a set of first beam-forming vectors respectively, and then transmitting a pilot, determining an optimum first beam-forming vector in the set of first beam-forming vectors according to a first measurement result on the pilot, and determining a set of second beam-forming vectors corresponding to the optimum first beam-forming vector, where there is a set of second beam-forming vectors corresponding to each first beam-forming vector, each first beam-forming vector is obtained as a result of bit quantization on a first-dimension space of the network device, and each second beam-forming vector is obtained as a result of bit quantization on a first-dimension space of a corresponding first beam-forming vector;

performing, by the network device, beam-forming on the pilot resources using vectors in the determined set of second beam-forming vectors respectively, and then transmitting a pilot, and determining an optimum second beam-forming vector in the set of second beam-forming vectors, and optimum pre-coding information in a second dimension according to a second measurement result on the pilot; and integrating, by the network device, the optimum second beam-forming vector, and the optimum pre-coding information in the second dimension into three-dimension beam pre-coding information.

Preferably performing, by the network device, beam-forming on the pilot resources using the vectors in the set of first beam-forming vectors respectively includes:

configuring, by the network device, N single-port pilot resources, and performing beam-forming on the respective single-port pilot resources using the vectors in the set of first beam-forming vectors respectively, where there are different first beam-forming vectors applicable to the respective single-port pilot resources, and N is a number of vectors in the set of first beam-forming vectors; or configuring, by the network device, one N-port pilot resource, and performing beam-forming on the N-port pilot resource using the vectors in the set of first beam-forming vectors respectively, where there are different first beam-forming vectors applicable to the respective ports of the N-port, and N is the number of vectors in the set of first beam-forming vectors; and performing, by the network device, beam-forming on the pilot resources using the vectors in the determined set of second beam-forming vectors respectively includes:

configuring, by the network device, M K-port pilot resources, and performing beam-forming on the respective K-port pilot resources using the vectors in the set of second beam-forming vectors respectively, where there is a same second beam-forming vector applicable to each K-port pilot resource, and there are different second beam-forming vectors applicable to the M respective K-port pilot resources, where M is a number of vectors in the set of second beam-forming vectors, and K is a number of antenna elements in the second dimension.

Preferably performing, by the network device, beam-forming on the pilot resources using the vectors in the set of first beam-forming vectors respectively includes:

configuring, by the network device, N K-port pilot resources, and performing beam-forming on the respective K-port pilot resources using the vectors in the set of first beam-forming vectors respectively, where there is a same first beam-forming vector applicable to each K-port pilot resource, and there are different first beam-forming vectors applicable to the N respective K-port pilot resources, where N is a number of vectors in the set of first beam-forming vectors, and K is a number of antenna elements in the second dimension; and performing, by the network device, beam-forming on the pilot resources using the vectors in the determined set of second beam-forming vectors respectively includes:

configuring, by the network device, M K-port pilot resources, and performing beam-forming on the respective K-port pilot resources using the vectors in the set of second beam-forming vectors respectively, where there is a same second beam-forming vector applicable to each K-port pilot resource, and there are different second beam-forming vectors applicable to the M respective K-port pilot resources, where M is a number of vectors in the set of second beam-forming vectors, and K is the number of antenna elements in the second dimension.

Preferably the network device performs beam-forming on the pilot resources using the vectors in the set of first beam-forming vectors respectively according to a first measurement periodicity; and the network device performs beam-forming on the pilot resources using the vectors in the set of second beam-forming vectors respectively according to a second measurement periodicity;

wherein there is a time offset of T0 sub-frames between the first measurement periodicity and the second measurement periodicity, wherein T0 is no less than a+1, and a is a number of sub-frames between a sub-frame in which the pilot is transmitted after beam-forming is performed on the pilot resources using the first beam-forming vectors and a sub-frame in which corresponding measurement results are fed back; and the first measurement periodicity includes P second measurement periodicities, wherein P≥1.

Preferably performing, by the network device, beam-forming on the pilot resources using the vectors in the set of first beam-forming vectors respectively includes:

configuring, by the network device, N single-port pilot resources, and performing beam-forming on the respective single-port pilot resources using the vectors in the set of first beam-forming vectors respectively, where there are different first beam-forming vectors applicable to the respective single-port pilot resources, and N is a number of vectors in the set of first beam-forming vectors; or configuring, by the network device, one N-port pilot resource, and performing beam-forming on the N-port pilot resource using the vectors in the set of first beam-forming vectors respectively, where there are different first beam-forming vectors applicable to the respective ports of the N-port, and N is the number of vectors in the set of first beam-forming vectors;

performing, by the network device, beam-forming on the pilot resources using the vectors in the determined set of second beam-forming vectors respectively includes:

configuring, by the network device, one M-port pilot resource, and performing beam-forming on each port pilot resource using the vectors in the set of second beam-forming vectors respectively, where there are different second beam-forming vectors applicable to the respective ports of the M-port, and M is a number of vectors in the set of second beam-forming vectors; or configuring, by the network device, M single-port pilot resources, and performing beam-forming on the respective single-port pilot resources using the vectors in the set of second beam-forming vectors respectively, where there are different second beam-forming vectors applicable to the respective single-port pilot resources, and M is the number of vectors in the set of second beam-forming vectors; and after the network device determines the optimum second beam-forming vector in the set of second beam-forming vectors according to the second measurement result on the pilot, the method further includes:

configuring, by the network device, one K-port pilot resource, and performing beam-forming on the K-port pilot resource using the determined optimum second beam-forming vector, where K is a number of antenna elements in the second dimension; and obtaining, by the network device, the optimum pre-coding information in the second dimension according to a third measurement result on the K-port.

Preferably the network device performs beam-forming on the pilot resources using the vectors in the set of first beam-forming vectors respectively according to a first measurement periodicity;

the network device performs beam-forming on the pilot resources using the vectors in the determined set of second beam-forming vectors respectively at according to second measurement periodicity; and the network device performs beam-forming on the K-port pilot resource using the determined optimum second beam-forming vector according to a third measurement periodicity;

where there is a time offset of T0 sub-frames between the first measurement periodicity and the second measurement periodicity, where T0 is no less than a+1, and a is a number of sub-frames between a sub-frame in which the pilot is transmitted after beam-forming is performed on the pilot resources using the first beam-forming vectors and a sub-frame in which the corresponding measurement results are fed back; there is a time offset of T1 sub-frames between the second measurement periodicity and the third measurement periodicity, where T1 is no less than b+1, and b is a number of sub-frames between a sub-frame in which the pilot is transmitted after beam-forming is performed on the pilot resources using the second beam-forming vectors and a sub-frame in which the corresponding measurement results are fed back; the first measurement periodicity includes P second measurement periodicities and P third measurement periodicities, wherein P≥1; and a length of the third measurement periodicity is equal to a length of the second measurement periodicity.

Preferably the pilot is a Channel State Information-Reference Signal (CSI-RS), and the first measurement result and the second measurement result are Reference Signal Received Power (RSRP) or Channel State Information (CSI).

Preferably the first dimension is a vertical dimension, and the second dimension is a horizontal dimension; or the first dimension is the horizontal dimension, and the second dimension is the vertical dimension.

An embodiment of the invention provides an apparatus for determining three-dimension beam pre-coding information, the apparatus including:

a first determining module configured to perform beam-forming on pilot resources using vectors in a set of first beam-forming vectors respectively, and then transmit a pilot, to determine an optimum first beam-forming vector in the set of first beam-forming vectors according to a first measurement result on the pilot, and to determine a set of second beam-forming vectors corresponding to the optimum first beam-forming vector, where there is a set of second beam-forming vectors corresponding to each first beam-forming vector, each first beam-forming vector is obtained as a result of bit quantization on a first-dimension space of the network device, and each second beam-forming vector is obtained as a result of bit quantization on the first-dimension space of a corresponding first beam-forming vector;

second determining module configured to perform beam-forming on the pilot resources using vectors in the determined set of second beam-forming vectors respectively, and then transmit a pilot, and to determine an optimum second beam-forming vector in the set of second beam-forming vectors, and optimum pre-coding information in a second dimension according to a second measurement result on the pilot; and an integrating module configured to integrate the optimum second beam-forming vector, and the optimum pre-coding information in the second dimension into three-dimension beam pre-coding information.

Preferably the first determining module is configured:

to configure N single-port pilot resources, and to perform beam-forming on the respective single-port pilot resources using the vectors in the set of first beam-forming vectors respectively, where there are different first beam-forming vectors applicable to the respective single-port pilot resources, and N is a number of vectors in the set of first beam-forming vectors; or to configure one N-port pilot resource, and to perform beam-forming on the N-port pilot resource using the vectors in the set of first beam-forming vectors respectively, where there are different first beam-forming vectors applicable to the respective ports of the N-port, and N is the number of vectors in the set of first beam-forming vectors; and the second determining module is configured:

to configure M K-port pilot resources, and to perform beam-forming on the respective K-port pilot resources using the vectors in the set of second beam-forming vectors respectively, where there is a same second beam-forming vector applicable to the each K-port pilot resource, and there are different second beam-forming vectors applicable to the M respective K-port pilot resources, where M is a number of vectors in the set of second beam-forming vectors, and K is a number of antenna elements in the second dimension.

Preferably the first determining module is configured:

to configure N K-port pilot resources, and to perform beam-forming on the respective K-port pilot resources using the vectors in the set of first beam-forming vectors respectively, where there is a same first beam-forming vector applicable to each K-port pilot resource, and there are different first beam-forming vectors applicable to the N respective K-port pilot resources, where N is a number of vectors in the set of first beam-forming vectors, and K is a number of antenna elements in the second dimension; and the second determining module is configured:

to configure M K-port pilot resources, and to perform beam-forming on the respective K-port pilot resources using the vectors in the set of second beam-forming vectors respectively, where there is a same second beam-forming vector applicable to each K-port pilot resource, and there are different second beam-forming vectors applicable to the M respective K-port pilot resources, where M is a number of vectors in the set of second beam-forming vectors, and K is the number of antenna elements in the second dimension.

Preferably the first determining module is configured:

the first determining module is configured:

to perform beam-forming on the pilot resources using the vectors in the set of first beam-forming vectors respectively according to a first measurement periodicity; and the second determining module is configured:

to perform beam-forming on the pilot resources using the vectors in the set of second beam-forming vectors respectively according to a second measurement periodicity;

where there is a time offset of T0 sub-frames between the first measurement periodicity and the second measurement periodicity, where T0 is no less than a+1, and a is a number of sub-frames between a sub-frame in which the pilot is transmitted after beam-forming is performed on the pilot resources using the first beam-forming vectors and a sub-frame in which corresponding measurement results are fed back; and the first measurement periodicity includes P second measurement periodicities, wherein P≥1.

Preferably the first determining module is configured:

to configure N single-port pilot resources, and to perform beam-forming on the respective single-port pilot resources using the vectors in the set of first beam-forming vectors respectively, where there are different first beam-forming vectors applicable to the respective single-port pilot resources, and N is a number of vectors in the set of first beam-forming vectors; or to configure one N-port pilot resource, and to perform beam-forming on the N-port pilot resource using the vectors in the set of first beam-forming vectors respectively, where there are different first beam-forming vectors applicable to the respective N-port pilot resource, and N is the number of vectors in the set of first beam-forming vectors;

the second determining module is configured:

to configure one M-port pilot resource, and to perform beam-forming on each port pilot resource using the vectors in the set of second beam-forming vectors respectively, where there are different second beam-forming vectors applicable to the respective ports of the M-port, and M is a number of vectors in the set of second beam-forming vectors; or to configure M single-port pilot resources, and to perform beam-forming on the respective single-port pilot resources using the vectors in the set of second beam-forming vectors respectively, where there are different second beam-forming vectors applicable to the respective single-port pilot resources, and M is the number of vectors in the set of second beam-forming vectors; and the second determining module is further configured:

to configure one K-port pilot resource, and to perform beam-forming on the K-port pilot resource using the determined optimum second beam-forming vector, wherein K is a number of antenna elements in the second dimension; and to obtain the optimum pre-coding information in the second dimension according to a third measurement result on the K-port.

Preferably the first determining module is configured:

to perform beam-forming on the pilot resources using the vectors in the set of first beam-forming vectors respectively according to a first measurement periodicity;

the second determining module is configured:

to perform beam-forming on the pilot resources using the vectors in the determined set of second beam-forming vectors respectively according to a second measurement periodicity; and the second determining module is further configured:

to perform beam-forming on the K-port pilot resource using the determined optimum second beam-forming vector according to a third measurement periodicity;

where there is a time offset of T0 sub-frames between the first measurement periodicity and the second measurement periodicity, where T0 is no less than a+1, and a is a number of sub-frames between a sub-frame in which the pilot is transmitted after beam-forming is performed on the pilot resources using the first beam-forming vectors and a sub-frame in which the corresponding measurement results are fed back; there is a time offset of T1 sub-frames between the second measurement periodicity and the third measurement periodicity, where T1 is no less than b+1, and b is a number of sub-frames between a sub-frame in which the pilot is transmitted after beam-forming is performed on the pilot resources using the second beam-forming vectors and a sub-frame in which the corresponding measurement results are fed back; the first measurement periodicity includes P second measurement periodicities and P third measurement periodicities, wherein P≥1; and a length of the third measurement periodicity is equal to a length of the second measurement periodicity.

Preferably the pilot is a Channel State Information-Reference Signal (CSI-RS), and the first measurement result and the second measurement result are Reference Signal Received Power (RSRP) or Channel State Information (CSI).

Preferably the first dimension is a vertical dimension, and the second dimension is a horizontal dimension; or the first dimension is the horizontal dimension, and the second dimension is the vertical dimension.

An embodiment of the invention provides an apparatus for determining three-dimension beam pre-coding information, the apparatus including:

a processor configured to perform beam-forming on pilot resources using vectors in a set of first beam-forming vectors respectively, and then transmit a pilot, to determine an optimum first beam-forming vector in the set of first beam-forming vectors according to a first measurement result on the pilot, and to determine a set of second beam-forming vectors corresponding to the optimum first beam-forming vector, where there is a set of second beam-forming vectors corresponding to each first beam-forming vector, each first beam-forming vector is obtained as a result of bit quantization on a first-dimension space of the network device, and each second beam-forming vector is obtained as a result of bit quantization on the first-dimension space of the corresponding first beam-forming vector; to perform beam-forming on the pilot resources using vectors in the determined set of second beam-forming vectors respectively, and then transmit a pilot, and to determine an optimum second beam-forming vector in the set of second beam-forming vectors, and optimum pre-coding information in a second dimension according to a second measurement result on the pilot; and to integrate the optimum second beam-forming vector, and the optimum pre-coding information in the second dimension into three-dimension beam pre-coding information;

the memory is configured to store all the first beam-forming vectors, the second beam-forming vectors, the pre-coding information in the second dimension, and the measurement results fed back by a user equipment; and the radio frequency circuit is configured to transmit the pilot.

Preferably the processor is configured:

to configure N single-port pilot resources, and to perform beam-forming on the respective single-port pilot resources using the vectors in the set of first beam-forming vectors respectively, where there are different first beam-forming vectors applicable to the respective single-port pilot resources, and N is a number of vectors in the set of first beam-forming vectors; or to configure one N-port pilot resource, and to perform beam-forming on the N-port pilot resource using the vectors in the set of first beam-forming vectors respectively, where there are different first beam-forming vectors applicable to the respective ports of the N-port, and N is the number of vectors in the set of first beam-forming vectors; and the processor is configured:

to configure M K-port pilot resources, and to perform beam-forming on the respective K-port pilot resources using the vectors in the set of second beam-forming vectors respectively, wherein there is a same second beam-forming vector applicable to each K-port pilot resource, and there are different second beam-forming vectors applicable to the M respective K-port pilot resources, where M is a number of vectors in the set of second beam-forming vectors, and K is a number of antenna elements in the second dimension.

Preferably the processor is configured:

to configure N K-port pilot resources, and to perform beam-forming on the respective K-port pilot resources using the vectors in the set of first beam-forming vectors respectively, where there is a same first beam-forming vector applicable to each K-port pilot resource, and there are different first beam-forming vectors applicable to the N respective K-port pilot resources, where N is the number of vectors in the set of first beam-forming vectors, and K is a number of antenna elements in the second dimension; and the processor is configured:

to configure M K-port pilot resources, and to perform beam-forming on the respective K-port pilot resources using the vectors in the set of second beam-forming vectors respectively, where there is a same second beam-forming vector applicable to the each K-port pilot resource, and there are different second beam-forming vectors applicable to the M respective K-port pilot resources, where M is a number of vectors in the set of second beam-forming vectors, and K is a number of antenna elements in the second dimension.

Preferably the processor is configured:

to perform beam-forming on the pilot resources using the vectors in the set of first beam-forming vectors respectively according to a first measurement periodicity; and the processor is configured:

to perform beam-forming on the pilot resources using the vectors in the set of second beam-forming vectors respectively according to a second measurement periodicity;

where there is a time offset of T0 sub-frames between the first measurement periodicity and the second measurement periodicity, where T0 is no less than a+1, and a is a number of sub-frames between a sub-frame in which the pilot is transmitted after beam-forming is performed on the pilot resources using the first beam-forming vectors and a sub-frame in which the corresponding measurement results are fed back; and the first measurement periodicity includes P second measurement periodicities, wherein P≥1.

Preferably the processor is configured:

to configure N single-port pilot resources, and to perform beam-forming on the respective single-port pilot resources using the vectors in the set of first beam-forming vectors respectively, where there are different first beam-forming vectors applicable to the respective single-port pilot resources, and N is the number of vectors in the set of first beam-forming vectors; or to configure one N-port pilot resource, and to perform beam-forming on the N-port pilot resource using the vectors in the set of first beam-forming vectors respectively, where there are different first beam-forming vectors applicable to the respective ports of the N-port, and N is the number of vectors in the set of first beam-forming vectors;

the processor is configured:

to configure one M-port pilot resource, and to perform beam-forming on each port pilot resource using the vectors in the set of second beam-forming vectors respectively, where there are different second beam-forming vectors applicable to the respective ports of the M-port, and M is the number of vectors in the set of second beam-forming vectors; or to configure M single-port pilot resources, and to perform beam-forming on the respective single-port pilot resources using the vectors in the set of second beam-forming vectors respectively, where there are different second beam-forming vectors applicable to the respective single-port pilot resources, and M is the number of vectors in the set of second beam-forming vectors; and the processor is further configured:

to configure one K-port pilot resource, and to perform beam-forming on the K-port pilot resource using the determined optimum second beam-forming vector, where K is the number of antenna elements in the second dimension; and to obtain the optimum pre-coding information in the second dimension according to a third measurement result on the K-port.

Preferably the processor is configured:

to perform beam-forming on the pilot resources using the vectors in the set of first beam-forming vectors respectively according to a first measurement periodicity;

the processor is configured:

to perform beam-forming on the pilot resources using the vectors in the determined set of second beam-forming vectors respectively according to a second measurement periodicity; and the processor is further configured:

to perform beam-forming on the K-port pilot resource using the determined optimum second beam-forming vector according to a third measurement periodicity;

where there is a time offset of T0 sub-frames between the first measurement periodicity and the second measurement periodicity, where T0 is no less than a+1, and a is the number of sub-frames between a sub-frame in which the pilot is transmitted after beam-forming is performed on the pilot resources using the first beam-forming vectors and a sub-frame in which the corresponding measurement results are fed back; there is a time offset of T1 sub-frames between the second measurement periodicity and the third measurement periodicity, where T1 is no less than b+1, and b is the number of sub-frames between a sub-frame in which the pilot is transmitted after beam-forming is performed on the pilot resources using the second beam-forming vectors and a sub-frame in which the corresponding measurement results are fed back; the first measurement periodicity includes P second measurement periodicities and P third measurement periodicities, wherein P≥1; and the length of the third measurement periodicity is equal to the length of the second measurement periodicity.

Preferably the pilot is a Channel State Information-Reference Signal (CSI-RS), and the first measurement result and the second measurement result are Reference Signal Received Power (RSRP) or Channel State Information (CSI).

Preferably the first dimension is the vertical dimension, and the second dimension is the horizontal dimension; or the first dimension is the horizontal dimension, and the second dimension is the vertical dimension.

In the embodiments of the invention, there is a set of first beam-forming vectors in the first dimension, and there is a set of second beam-forming vectors corresponding to each first beam-forming vector, where each first beam-forming vector is obtained as a result of bit quantization on the first-dimension space of the network device, and each second beam-forming vector is obtained as a result of bit quantization on the first-dimension space of the corresponding first beam-forming vector, that is, the first beam-forming vector is such a beam-forming vector with a coarse granularity that is obtained as a result of low bit quantization on the first-dimension space of the network device, and the second beam-forming vector is such a beam-forming vector with a fine granularity that is obtained as a result of high bit quantization on the first-dimension space of the network device. The third-dimension beam pre-coding information is determined in such a way that the network device firstly performs beam-forming using the elements in the set of first beam-forming vectors, and determines the optimum first beam-forming vector according to the feedback of the user equipment; then performs beam-forming using the elements in the set of second beam-forming vectors corresponding to the optimum first beam-forming vector, and determines the optimum second beam-forming vector, and the optimum pre-coding information in the second dimension based upon the feedback of the user equipment; and further integrates the optimum second beam-forming vector, and the optimum pre-coding information in the second dimension into the third-dimension beam pre-coding information. Firstly the optimum beam-forming vector is determined among the set of beam-forming vectors with the coarse granularity, and then the optimum beam-forming vector is determined among the corresponding set of beam-forming vectors with the fine granularity, so that the optimum beam-forming vector at the fine granularity, and the optimum pre-coding information are determined without measuring on all the beam-forming vectors with the fine granularity to thereby alleviate a resource overhead of the system, and further lower the complexity of the user equipment, as compared with the prior art.

DETAILED DESCRIPTION OF THE EMBODIMENTS

In order to make the objects, technical solutions, and advantageous effects of the invention more apparent, the invention will be described below in further details with reference to the drawings and the embodiments thereof. It shall be appreciated that the particular embodiments described here are merely intended to illustrate but not to limit the invention.

Figure 1:
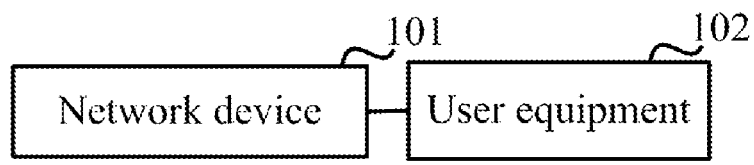
FIG. 1 is a schematic architectural diagram of a system for determining three-dimension beam pre-coding information according to an embodiment of the invention.

As illustrated in FIG. 1 which is a schematic architectural diagram of a system to which the embodiments of the invention are applicable, the architecture of the system includes a network device 101 and at least one user equipment 102, where the network device can be a base station, and the user equipment can be a user equipment capable of wireless communication, e.g., a mobile phone, etc.

The network device 101 can transmit a pilot to the user equipment 102, and perform beam-forming on antennas according to information fed back by the user equipment 102.

The pilot can be used to make a Channel State Information (CSI) measurement, or a Reference Signal Received Power (RSRP) measurement, etc. After the user equipment receives the pilot sent by the network device, the user equipment makes the measurement, and feeds CSI or RSRP, and index information thereof back to the network device.

Figure 2:
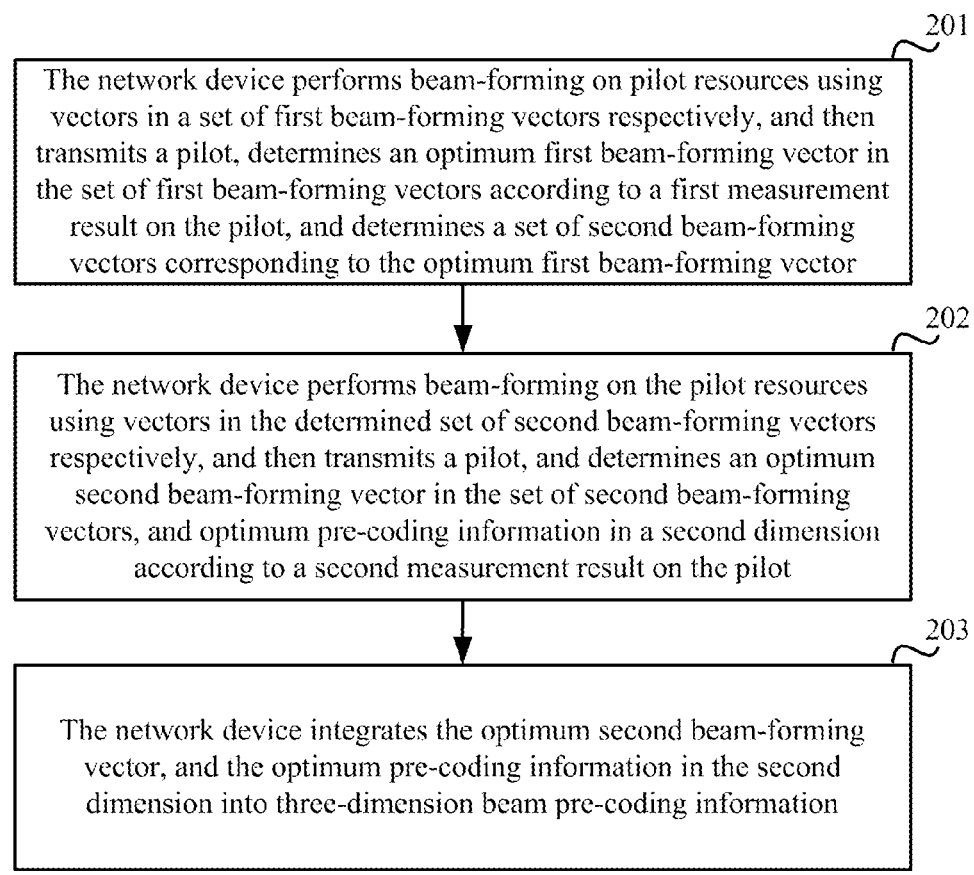
FIG. 2 is a schematic flow chart of a method for determining three-dimension beam pre-coding information according to an embodiment of the invention.

Based on the architecture of the system illustrated in FIG. 1, FIG. 2 illustrates a method for determining three-dimension beam pre-coding information according to an embodiment of the invention, where the method includes the following operations:

In the operation 201, the network device performs beam-forming on pilot resources using vectors in a set of first beam-forming vectors respectively, and then transmits a pilot, determines an optimum first beam-forming vector in the set of first beam-forming vectors according to a first measurement result on the pilot, and determines a set of second beam-forming vectors corresponding to the optimum first beam-forming vector.

Here there is a set of second beam-forming vectors corresponding to each first beam-forming vector, each first beam-forming vector is obtained as a result of bit quantization on a first-dimension space of the network device, and each second beam-forming vector is obtained as a result of bit quantization on the first-dimension space of the corresponding first beam-forming vector.

Each first beam-forming vector is such a beam-forming vector with a coarse granularity that is obtained as a result of low bit quantization on the first-dimension space of the network device, and each second beam-forming vector is a beam-forming vector with a fine granularity. There is such a set of second beam-forming vectors corresponding to each first beam-forming vector, which is a beam-forming vector with a coarse granularity, that includes M second beam-forming vectors, each of which is obtained as a result of high bit quantization on the first-dimension space of the network device. Particularly there is a larger width of a beam formed using a first beam-forming vector, and the width of the beam formed using the first beam-forming vector is subdivided into M sub-beam widths, which are widths of M sub-beams formed using M second beam-forming vectors corresponding to the first beam-forming vector.

In the operation 202, the network device performs beam-forming on the pilot resources using vectors in the determined set of second beam-forming vectors respectively, and then transmits a pilot, and determines an optimum second beam-forming vector in the set of second beam-forming vectors, and optimum pre-coding information in a second dimension according to a second measurement result on the pilot.

In the operation 203, the network device integrates the optimum second beam-forming vector, and the optimum pre-coding information in the second dimension into three-dimension beam pre-coding information.

In the operation 201 and the operation 202 of the flow above, the pilot may be a CSI-RS, the first measurement result includes at least RSRP and/or CSI, and the second measurement result includes at least CSI. Optionally the RSRP in the measurement result fed back by the user equipment may be all the RSRP measured by the user equipment, and their indexes, or may be the index of optimum RSRP measured by the user equipment, and the CSI in the measurement result fed back by the user equipment may be all the CSI measured by the user equipment, and their indexes, or may be optimum RSRP measured by the user equipment, and the index thereof.

The CSI includes a Channel Quality Indicator (CQI), a Pre-coding Matrix Index (PMI), a Rank Indication (RI), and other information.

In the operation 202, the network device performs beam-forming on the pilot resources using the vectors in the determined set of second beam-forming vectors respectively, and then transmits the pilot, where the pilot in this operation is used to measure channel information in the second dimension, and the network device determines the optimum second beam-forming vector in the set of second beam-forming vectors, and the optimum pre-coding information in the second dimension according to the second measurement result on the pilot.

In the flow above, both the first beam-forming vectors and the second beam-forming vectors are beam-forming vectors in the vertical dimension, and the optimum second beam-forming vector in the vertical dimension, and the optimum pre-coding information in the horizontal dimension can be integrated into the three-dimension beam pre-coding information. Alternatively both the first beam-forming vectors and the second beam-forming vectors are beam-forming vectors in the horizontal dimension, and the optimum second beam-forming vector in the horizontal dimension, and the optimum pre-coding information in the vertical dimension can be integrated into the three-dimension beam pre-coding information.

As can be apparent from the description above, the optimum first beam-forming vector with lower bit quantization is determined to thereby narrow rapidly a scope in which the optimum first beam-forming vector is determined, and thereafter the optimum second beam-forming vectors with higher bit quantization is determined among the second beam-forming vectors corresponding to the optimum first beam-forming vector, so that the optimum second beam-forming vector can be determined rapidly without measuring on all the beam-forming vectors.

Further to the flow illustrated in FIG. 2, several preferred implementations thereof will be described below with reference to FIG. 3a, FIG. 4a, and FIG. 5a respectively in order to make the embodiments of the invention more apparent.

Figure 3A:
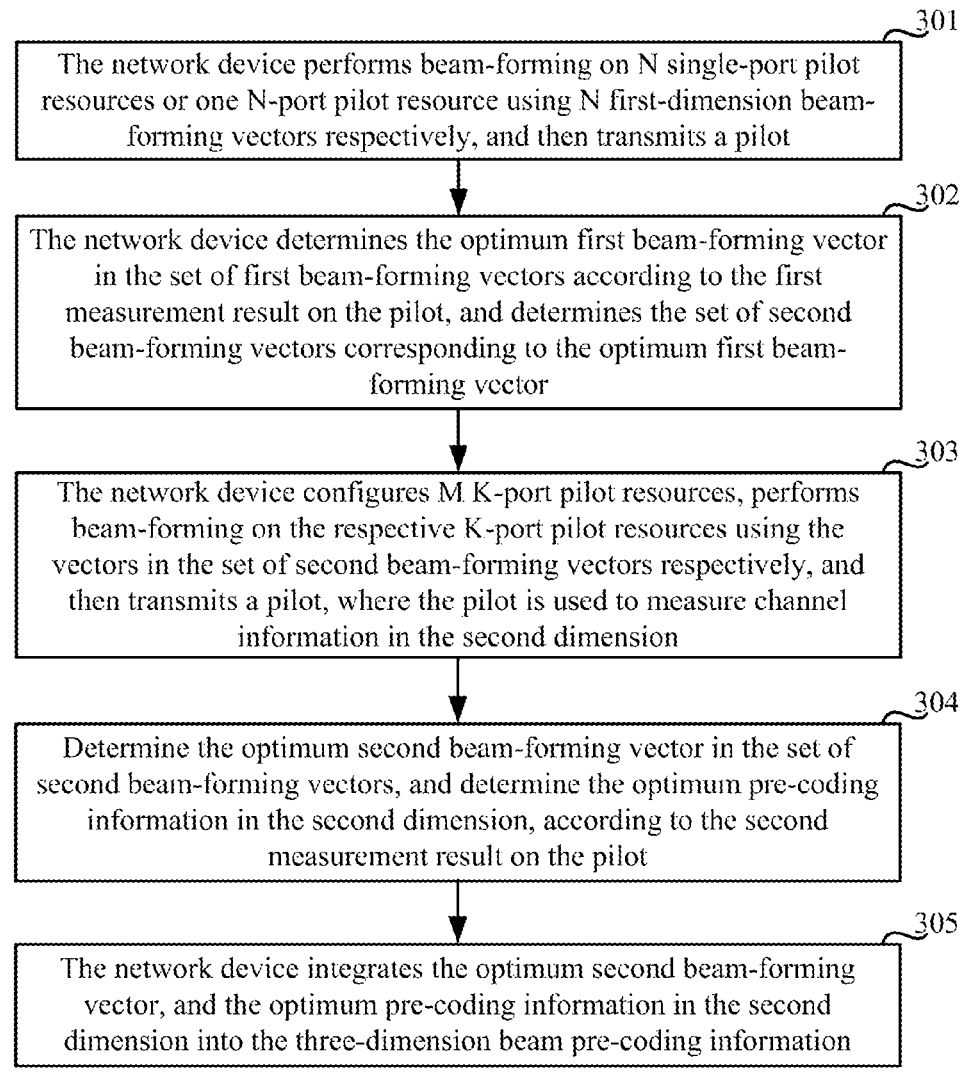
FIG. 3a is a schematic flow chart of a method for determining three-dimension beam pre-coding information according to an embodiment of the invention.

As illustrated in FIG. 3a, the flow can include the following operations:

In the operation 301, the network device performs beam-forming on N single-port pilot resources or one N-port pilot resource using N first-dimension beam-forming vectors respectively, and then transmits a pilot.

In this operation, the network device configures the N single-port pilot resources, and performs beam-forming on the respective single-port pilot resources using the vectors in the set of first beam-forming vectors respectively, where there are different first beam-forming vectors applicable to the respective single-port pilot resources, and N is the number of vectors in the set of first beam-forming vectors.

Alternatively the network device configures one N-port pilot resource, and performs beam-forming on the N-port pilot resource using the vectors in the set of first beam-forming vectors respectively, where there are different first beam-forming vectors applicable to the respective ports of the N-port, and N is the number of vectors in the set of first beam-forming vectors.

In the operation 302, the network device determines the optimum first beam-forming vector in the set of first beam-forming vectors according to the first measurement result on the pilot, and determines the set of second beam-forming vectors corresponding to the optimum first beam-forming vector.

In this operation, the user equipment measures RSRP on the pilot resources, on which beam-forming is performed using the first beam-forming vectors, transmitted by the network device in the operation 301 upon reception of the pilot resources.

Optionally the user equipment can select the optimum RSRP from the RSRP of the respective pilot resources, and feed the index of the pilot resource, or the index of the port corresponding to the optimum RSRP back to the network device, so that the network device determines the optimum first beam-forming vector according to a correspondence relationship between the index and the first beam-forming vector. Alternatively the user equipment feeds the RSRP of all the pilot resources, and their indexes back to the network device, so that the network device selects the optimum RSRP among the respective received RSRP, and determines the optimum first beam-forming vector according to a correspondence relationship between the index of the pilot resource, or the index of the port corresponding to the optimum RSRP, and the first beam-forming vector.

As can be known from the description above, there is a sub-set of M second beam-forming vectors corresponding to each first beam-forming vector, and the set of second beam-forming vectors corresponding to the optimum first determined beam-forming vector is determined according to the optimum first beam-forming vector.

In the operation 303, the network device configures M K-port pilot resources, performs beam-forming on the respective K-port pilot resources using the vectors in the set of second beam-forming vectors respectively, and then transmits the pilot, where the pilot is used to measure channel information in the second dimension.

Here there is the same second beam-forming vector applicable to the each K-port pilot resource, and there are different second beam-forming vectors applicable to the M respective K-port pilot resources, where M is the number of vectors in the set of second beam-forming vectors, and K is the number of antenna elements in the second dimension.

Since there are M second beam-forming vectors, there are M pilot resources on which beam-forming is performed using the M second beam-forming vectors respectively; and since the optimum pre-coding information in the second dimension needs to be determined in this operation, and the number of antenna elements in the second dimension is K, each pilot resource needs to be configured with a K-port, where there is the same second beam-forming vector applicable to the K-port over each pilot resource. The pilot transmitted via the K-port over the each pilot resource is used to measure channel information in the second dimension.

The operation 304 is to determine the optimum second beam-forming vectors in the set of second beam-forming vectors, and to determine the optimum pre-coding information in the second dimension, according to the second measurement result on the pilot.

As can be apparent from the description above, both the first beam-forming vectors and the second beam-forming vectors are beam-forming vectors in the first dimension. In an implementation, the user equipment measures CSI on the pilot resources, on which beam-forming is performed using the second beam-forming vectors in the first dimension, transmitted by the network device in the operation 303 upon reception of the pilot resources, where the pilot is used to measure channel information in the second dimension.

Optionally the user equipment can select the optimum CSI from the CSIs of all the pilot resources, and feeds the optimum CSI and the index thereof back to the network device, so that the network device determines the optimum second beam-forming vector according to a correspondence relationship between the index of the optimum CSI, and the second beam-forming vector, and obtains the optimum pre-coding information in the second dimension according to PMI information in the optimum CSI. Alternatively the user equipment can feed the CSIs of all the pilot resources, and their indexes back to the network device, so that the network device selects the optimum CSI among the respective received CSI, determines the optimum second beam-forming vector according to a correspondence relationship between the index of the pilot resource corresponding to the optimum CSI, and the second beam-forming vector, and obtains the optimum pre-coding information in the second dimension according to PMI information in the optimum CSI.

In the operation 305, the network device integrates the optimum second beam-forming vector, and the optimum pre-coding information in the second dimension into the three-dimension beam pre-coding information.

Both the first beam-forming vectors and the second beam-forming vectors are beam-forming vectors in the first dimension, and the determined optimum second beam-forming vector in the first dimension, and optimum pre-coding information in the second dimension are integrated into the three-dimension beam pre-coding information.

Figure 3B:
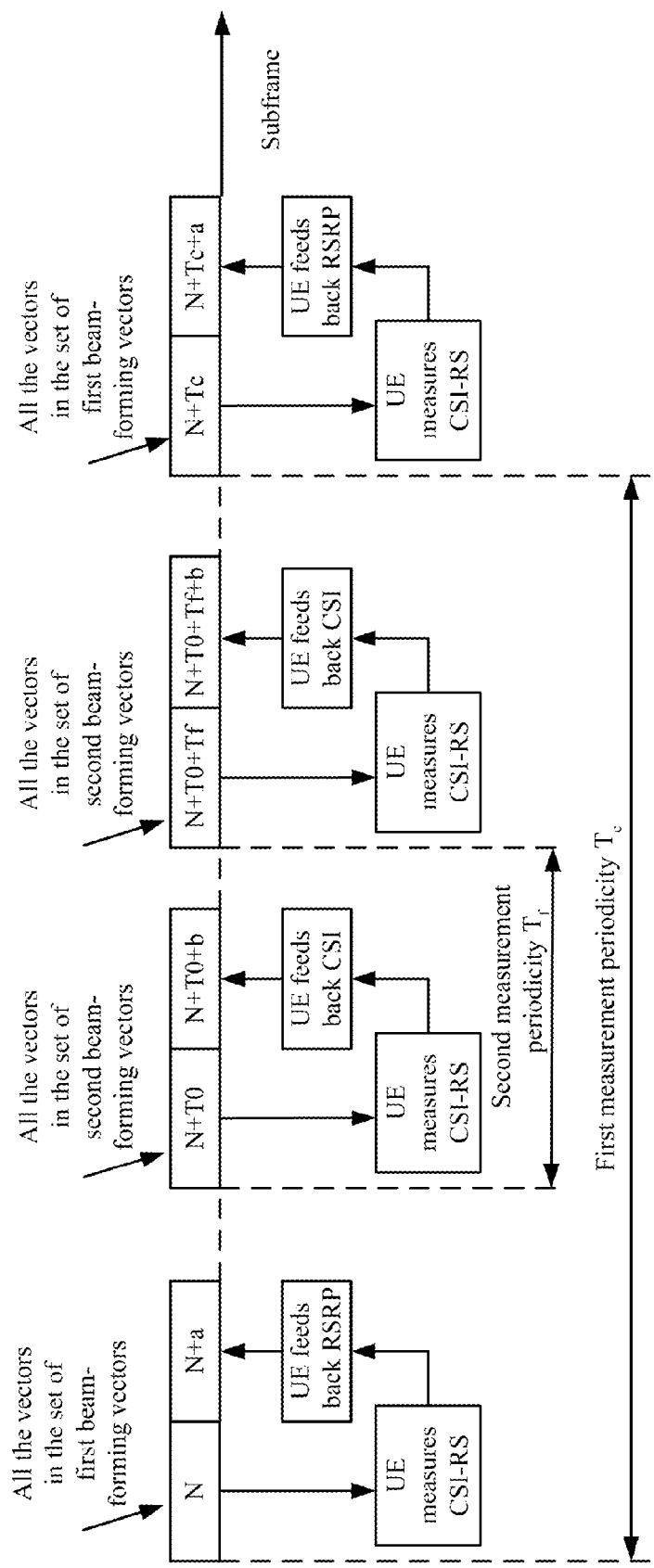
FIG. 3b is a block diagram of timing for determining three-dimension beam pre-coding information according to an embodiment of the invention.

In an implementation, since the user equipment may move, etc., the base station needs to update its own three-dimension beam pre-coding information. As illustrated in FIG. 3b which is a block diagram of timing corresponding to the flow of the method in the operations 301 to 305 above according to the embodiments of the invention, as can be apparent from FIG. 3b, the network device performs beam-forming on the pilot resources using the vectors in the set of first beam-forming vectors respectively according to a first measurement periodicity; and the network device performs beam-forming on the pilot resources using the vectors in the determined set of second beam-forming vectors respectively according to a second measurement periodicity.

In an implementation, firstly the optimum first beam-forming vector, and then the optimum second beam-forming vector are determined, so the pilot is transmitted after beam-forming is performed on the pilot resources using the first beam-forming vectors, and thereafter the measurement results corresponding to the pilot may be received in a next sub-frame to a sub-frame in which the pilot is transmitted, or after several sub-frames subsequent to the transmission of the pilot; and the measurement at the second measurement periodicity will be performed in a next sub-frame to a sub-frame in which the measurement results corresponding to the pilot are fed back, and some sub-frame after the next sub-frame, where there is a time offset of T0 sub-frames between the first measurement periodicity and the second measurement periodicity, where T0 is no less than a+1, and a is the number of sub-frames between the sub-frame in which the pilot is transmitted after beam-forming is performed on the pilot resources using the first beam-forming vectors and the sub-frame in which the corresponding measurement results are fed back.

The length of the first measurement periodicity is more than or equal to the length of the second measurement periodicity, where the first measurement periodicity includes P second measurement periodicities, where $P \geq 1$.

Since the first measurement periodicity is used to determine the optimum first beam-forming vector, the first beam-forming vector is obtained as a result of low bit quantization on the first-dimension space, and each second beam-forming vector is obtained as a result of high bit quantization on the first-dimension space, the user equipment will not move over a long distance in a short period of time, so that simply the second measurement periodicity will be repeated in the short period of time, that is, the optimum second beam-forming vector can be determined again and again in the short period of time; and the optimum first beam-forming vector can be determined again in a long period of time. Preferably the optimum second beam-forming vector can be determined once or more in the first measurement periodicity, that is, the first measurement periodicity can include one or more second measurement periodicities.

The measurement periodicities are preset for the respective measurements so that the optimum three-dimension beam-forming vector can be updated periodically to thereby improve the performance of the system, and furthermore the first beam-forming vectors are updated less frequently, and the second beam-forming vectors, and the pre-coding information in the second-dimension are updated more frequently, to thereby achieving the effect alleviating resource consumption so as to further improve the performance of the system.

In the embodiment illustrated in FIG. 3a, firstly the optimum first beam-forming vector is determined among the N first beam-forming vectors, and then the optimum second beam-forming vector, and the optimum pre-coding information in the second dimension is determined among the M K-port pilot resources, on which beam-forming is performed using the second beam-forming vectors. As can be apparent, there are a small number of measurement vectors in this process for the purpose of converging rapidly the optimum second beam-forming vector, and the optimum pre-coding information in the second dimension so as to prepare for rapid three-dimension beam-forming.

Figure 4A:
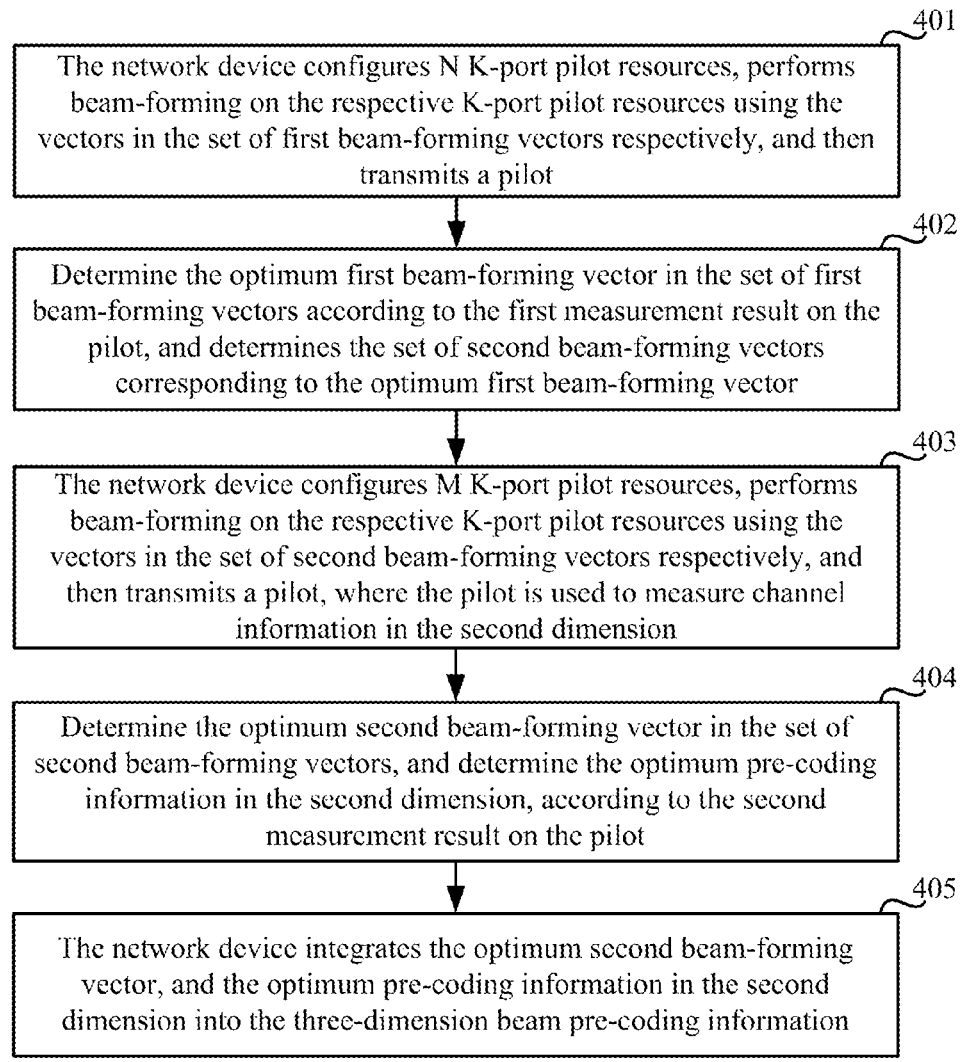
FIG. 4a is a schematic flow chart of a method for determining three-dimension beam pre-coding information according to an embodiment of the invention.

As illustrated in FIG. 4a, the flow can include:

In the operation 401, the network device configures N K-port pilot resources, performs beam-forming on the respective K-port pilot resources using the vectors in the set of first beam-forming vectors respectively, and then transmits a pilot.

Here there is the same first beam-forming vector applicable to each K-port pilot resource, and there are different first beam-forming vectors applicable to the N respective K-port pilot resources, where N is the number of vectors in the set of first beam-forming vectors, and K is the number of antenna elements in the second dimension;

Since there are N first beam-forming vectors, there are N pilot resources on which beam-forming is performed using the N first beam-forming vectors respectively; and since the optimum pre-coding information in the first dimension needs to be determined in this operation, and the number of antenna elements in the first dimension is K, each pilot resource needs to be configured with K ports, where there is the same first beam-forming vector applicable to each K-port pilot resource.

In the operation 402, the network device determines the optimum first beam-forming vector in the set of first beam-forming vectors according to the first measurement result on the pilot, and determines the set of second beam-forming vectors corresponding to the optimum first beam-forming vector.

In an implementation, the user equipment measures on the pilot resources, on which beam-forming is performed using the first beam-forming vectors in the first dimension, transmitted by the network device in the operation 401 upon reception of the pilot resources, and the measurement result is CSI. Those skilled in the art can appreciate the CSI includes more information than that of the RSRP, and the CSI can assist the network device and/or the user equipment in determining the optimum beam-forming vector more precisely and rapidly.

In an implementation, the user equipment measures on the pilot resources, on which beam-forming is performed using the first beam-forming vectors, transmitted by the network device in the operation 401 upon reception of the pilot resources, and the measurement result is CSI.

Optionally the user equipment can select the optimum CSI from the CSIs of the respective pilot resources, and feed the index of the pilot resource corresponding to the optimum CSI back to the network device, so that the network device determines the optimum first beam-forming vector according to a correspondence relationship between the index of the optimum CSI, and the first beam-forming vector. Alternatively the user equipment feeds the CSIs of all the pilot resources, and their indexes back to the network device, so that the network device selects the optimum CSI among the respective received CSI, and determines the optimum first beam-forming vector according to a correspondence relationship between the index of the pilot resource corresponding to the optimum CSI, and the first beam-forming vector.

As can be known from the description above, there is a sub-set of M second beam-forming vectors corresponding to each first beam-forming vector, and the set of second beam-forming vectors corresponding to the optimum first determined beam-forming vector is determined according to the optimum first beam-forming vector.

In the operation 403, the network device configures M K-port pilot resources, performs beam-forming on the respective K-port pilot resources using the vectors in the set of second beam-forming vectors respectively, and then transmits the pilot, where the pilot is used to measure channel information in the second dimension.

Here there is the same second beam-forming vector applicable to each K-port pilot resource, and there are different second beam-forming vectors applicable to the M respective K-port pilot resources, where M is the number of vectors in the set of second beam-forming vectors, and K is the number of antenna elements in the second dimension.

Since there are M second beam-forming vectors, there are M pilot resources on which beam-forming is performed using the M second beam-forming vectors respectively; and since the optimum pre-coding information in the second dimension needs to be determined in this operation, and the number of antenna elements in the second dimension is K, each pilot resource needs to be configured with K ports, where there is the same second beam-forming vector applicable to each K-port pilot resource. The pilot transmitted via the K-port over the each pilot resource is used to measure channel information in the second dimension.

The operation 404 is to determine the optimum second beam-forming vector in the set of second beam-forming vectors, and to determine the optimum pre-coding information in the second dimension, according to the second measurement result on the pilot.

As can be apparent from the description above, both the first beam-forming vectors and the second beam-forming vectors are beam-forming vectors in the first dimension. In an implementation, the user equipment measures on the pilot resources, on which beam-forming is performed using the second beam-forming vectors in the first dimension, transmitted by the network device in the operation 403 upon reception of the pilot resources, and the measurement result is CSI.

Optionally the user equipment can select the optimum CSI from the CSIs of all the pilot resources, and feed the index of the pilot resource corresponding to the optimum CSI back to the network device, so that the network device determines the optimum second beam-forming vector according to a correspondence relationship between the index of the optimum CSI, and the second beam-forming vector, and determines the optimum pre-coding information in the second dimension according to PMI information in the optimum CSI. Alternatively the user equipment can feed the CSIs of all the pilot resources, and their indexes back to the network device, so that the network device selects the optimum CSI among the respective received CSI, determines the optimum second beam-forming vector according to a correspondence relationship between the index of the pilot resource corresponding to the optimum CSI, and the second beam-forming vector, and determines the optimum pre-coding information in the second dimension according to PMI information in the optimum CSI.

In the operation 405, the network device integrates the optimum second beam-forming vector, and the optimum pre-coding information in the second dimension into the three-dimension beam pre-coding information.

Both the first beam-forming vectors and the second beam-forming vectors are beam-forming vectors in the first dimension, and the determined optimum second beam-forming vector in the first dimension, and optimum pre-coding information in the second dimension are integrated into the three-dimension beam pre-coding information.

Figure 4B:
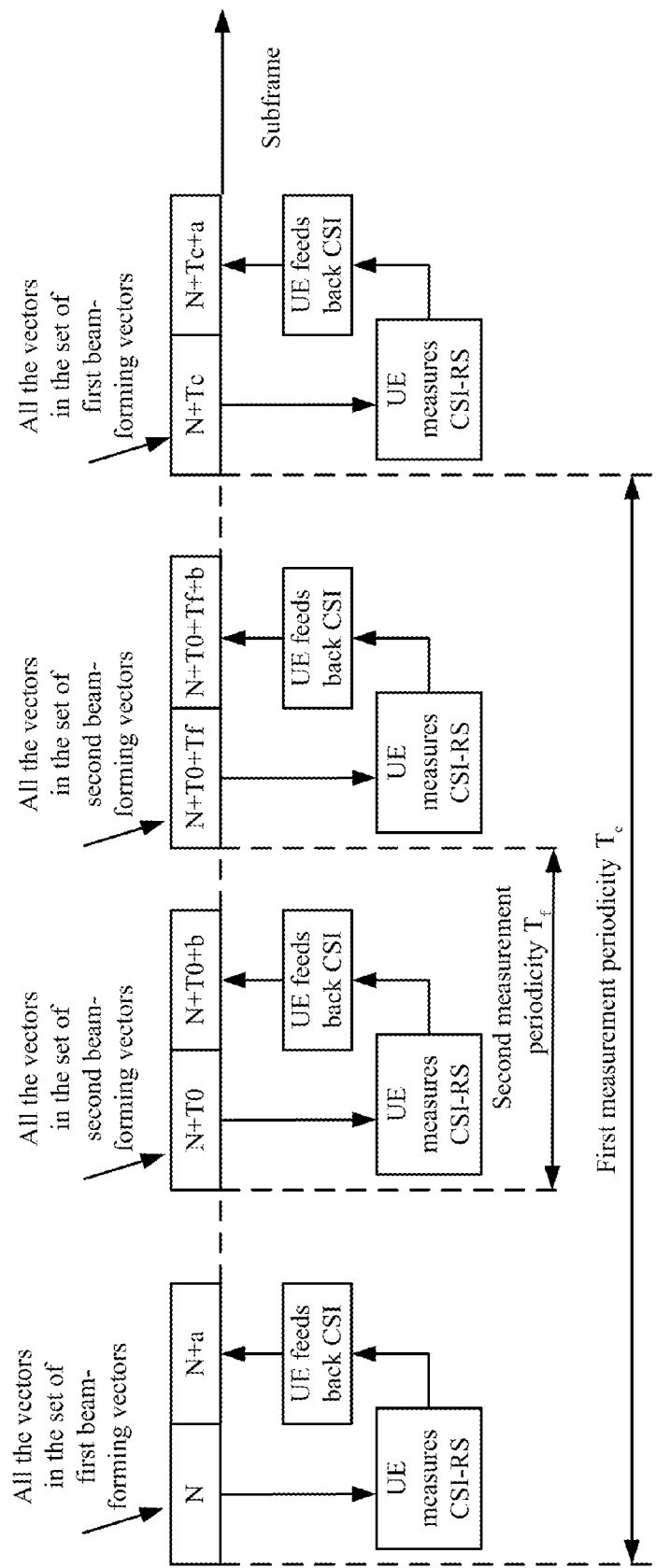
FIG. 4b is a block diagram of timing for determining three-dimension beam pre-coding information according to an embodiment of the invention.

In an implementation, since the user equipment may move, etc., the base station needs to update its own three-dimension beam pre-coding information. As illustrated in FIG. 4b which is a block diagram of timing corresponding to the flow of the method in the operations 401 to 405 above according to the embodiments of the invention, as can be apparent from FIG. 4b, the network device performs beam-forming on the pilot resources using the vectors in the set of first beam-forming vectors respectively according to a first measurement periodicity; and the network device performs beam-forming on the pilot resources using the vectors in the determined set of second beam-forming vectors respectively according to a second measurement periodicity.

In an implementation, firstly the optimum first beam-forming vector, and then the optimum second beam-forming vector are determined, so the pilot is transmitted after beam-forming is performed on the pilot resources using the first beam-forming vectors, and thereafter the measurement results corresponding to the pilot may be received in a next sub-frame to a sub-frame in which the pilot is transmitted, or after several sub-frames subsequent to the transmission of the pilot; and the measurement at the second measurement periodicity will be performed in a next sub-frame to a sub-frame in which the measurement results corresponding to the pilot are fed back, and some sub-frame after the next sub-frame, where there is a time offset of T0 sub-frames between the first measurement periodicity and the second measurement periodicity, where T0 is no less than a+1, and a is the number of sub-frames between the sub-frame in which the pilot is transmitted after beam-forming is performed on the pilot resources using the first beam-forming vectors and the sub-frame in which the corresponding measurement results are fed back.

The length of the first measurement periodicity is more than or equal to the length of the second measurement periodicity, where the first measurement periodicity includes P second measurement periodicities, where P≥1.

Since the first measurement periodicity is used to determine the optimum first beam-forming vector, the first beam-forming vector is obtained as a result of low bit quantization on the first-dimension space, and each second beam-forming vector is obtained as a result of high bit quantization on the first-dimension space, the user equipment will not move over a long distance in a short period of time, so that simply the second measurement periodicity will be repeated in the short period of time, that is, the optimum second beam-forming vectors can be determined again and again in the short period of time; and the optimum first beam-forming vector can be determined again in a long period of time. Preferably the optimum second beam-forming vectors can be determined once or more in the first measurement periodicity, that is, the first measurement periodicity can include one or more second measurement periodicities.

The measurement periodicities are preset for the respective measurements so that the optimum three-dimension beam-forming vector can be updated periodically to thereby improve the performance of the system, and furthermore the first beam-forming vectors are updated less frequently, and the second beam-forming vectors, and the pre-coding information in the second-dimension are updated more frequently, to thereby achieving the effect alleviating resource consumption so as to further improve the performance of the system.

In the second implementation, firstly the optimum first beam-forming vector is determined among the N K-port pilot resources on which beam-forming is performed using the first beam-forming vectors, and then the optimum second beam-forming vector, and the optimum pre-coding information in the second dimension are determined among the M K-port pilot resources on which beam-forming is performed using the second beam-forming vectors; and as can be apparent, there are a small number of measurement vectors in this process for the purpose of converging rapidly the optimum second beam-forming vector, and the optimum pre-coding information in the second dimension so as to prepare for rapid three-dimension beam-forming.

Figure 5A:
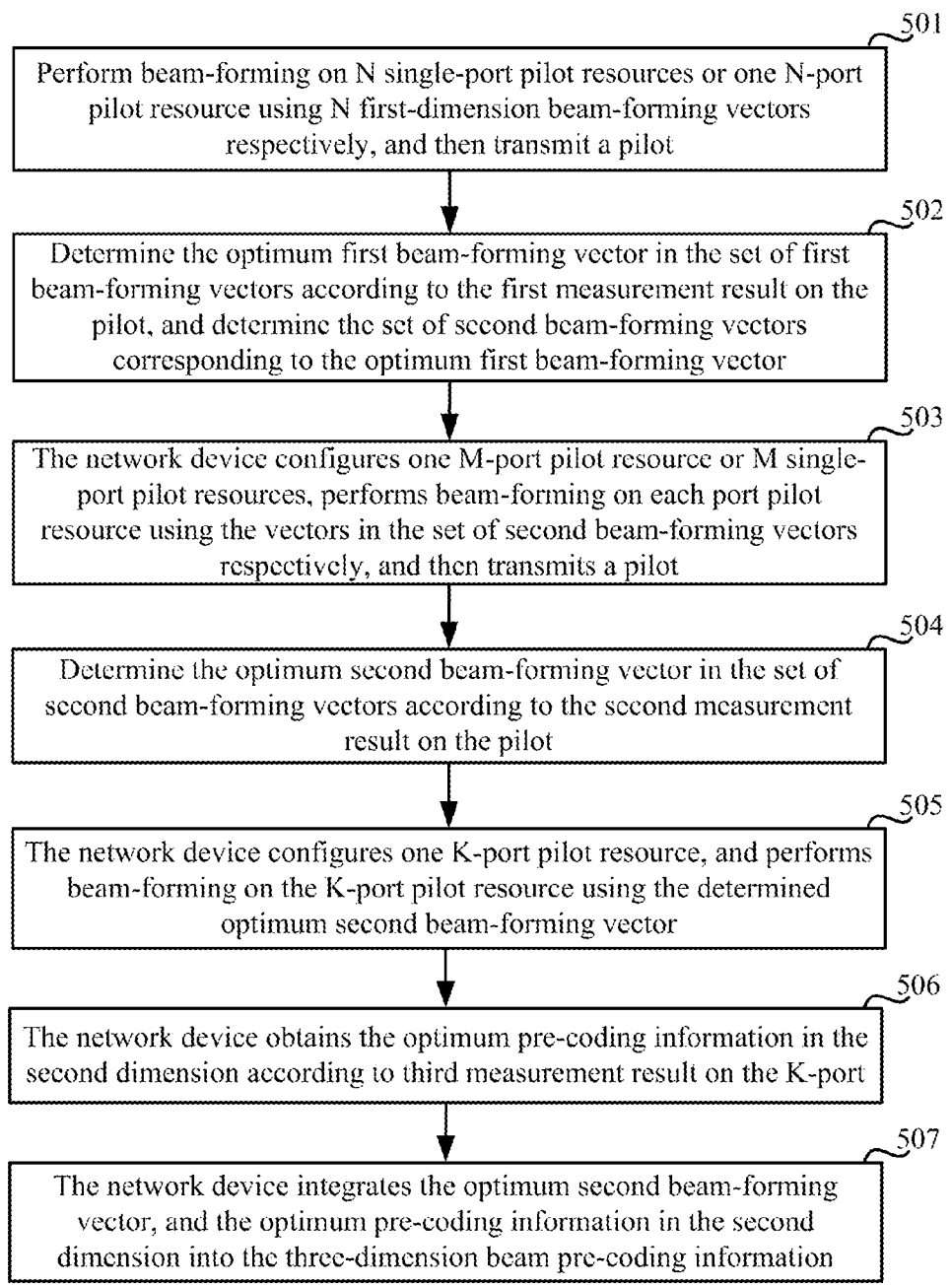
FIG. 5a is a schematic flow chart of a method for determining three-dimension beam pre-coding information according to an embodiment of the invention.

As illustrated in FIG. 5a, the flow can include:

In the operation 501, performing beam-forming on N single-port pilot resources or one N-port pilot resource using N first-dimension beam-forming vectors respectively, and then transmitting a pilot.

In this operation, the network device configures the N single-port pilot resources, and performs beam-forming on the respective single-port pilot resources using the vectors in the set of first beam-forming vectors respectively, where there are different first beam-forming vectors applicable to the respective single-port pilot resources, and N is the number of vectors in the set of first beam-forming vectors. Alternatively the network device configures the N-port pilot resource, and performs beam-forming on the N-port pilot resource using the vectors in the set of first beam-forming vectors respectively, where there are different first beam-forming vectors applicable to the respective ports of the N-port, and N is the number of vectors in the set of first beam-forming vectors.

In the operation 502, determining the optimum first beam-forming vector in the set of first beam-forming vectors according to the first measurement result on the pilot, and determining the set of second beam-forming vectors corresponding to the optimum first beam-forming vector.

In this operation, the user equipment measures on the pilot resources, on which beam-forming is performed using the first beam-forming vectors, transmitted by the network device in the operation 501 upon reception of the pilot resources, and the measurement result is RSRP.

Optionally the user equipment can select the optimum RSRP from the RSRP of all the pilots, and feed the index of the pilot resource, or the index of the port corresponding to the optimum RSRP back to the network device, so that the network device determines the optimum first beam-forming vector according to a correspondence relationship between the index of the optimum RSRP, and the first beam-forming vector. Alternatively the user equipment feeds the RSRP of all the pilots, and their indexes back to the network device, so that the network device selects the optimum RSRP among the respective received RSRP, and thereafter determines the optimum first beam-forming vector according to a correspondence relationship between the index of the pilot resource, or the index of the port corresponding to the optimum RSRP, and the first beam-forming vector.

As can be known from the description above, there is a sub-set of M second beam-forming vectors corresponding to each first beam-forming vector, and the set of second beam-forming vectors corresponding to the determined optimum first beam-forming vector is determined according to the optimum first beam-forming vector.

In the operation 503, configuring, by the network device, one M-port pilot resource or M single-port pilot resources, performs beam-forming on each port pilot resource using the vectors in the set of second beam-forming vectors respectively, and then transmits a pilot.

In this operation, the network device configures the M-port pilot resource, and performs beam-forming on each port pilot resource using the vectors in the set of second beam-forming vectors respectively, where there are different second beam-forming vectors applicable to the respective M-port pilot resource, and M is the number of vectors in the set of second beam-forming vectors. Alternatively the network device configures the M single-port pilot resources, and performs beam-forming on the respective single-port pilot resources using the vectors in the set of second beam-forming vectors respectively, where there are different second beam-forming vectors applicable to the respective single-port pilot resources, and M is the number of vectors in the set of second beam-forming vectors.

In the operation 504, determining the optimum second beam-forming vector in the set of second beam-forming vectors according to the second measurement result on the pilot.

As can be apparent from the description above, both the first beam-forming vectors and the second beam-forming vectors are beam-forming vectors in the first dimension. In an implementation, the user equipment measures on the pilot resources, beam-formed using the second beam-forming vectors in the first dimension, transmitted by the network device in the operation 503 upon reception of the pilot resources, and the measurement result is RSRP.

Optionally the user equipment can select the optimum RSRP from the RSRP of all the pilots, and feed the index of the pilot resource, or the index of the port corresponding to the optimum RSRP back to the network device, so that the network device determines the optimum second beam-forming vector according to a correspondence relationship between the index of the optimum RSRP, and the second beam-forming vector. Alternatively the user equipment feeds the RSRP of all the pilots, and their indexes back to the network device, so that the network device selects the optimum RSRP among the respective received RSRP, and determines the optimum second beam-forming vector according to a correspondence relationship between the index of the pilot resource, or the index of the port corresponding to the optimum RSRP, and the second beam-forming vector.

In the operation 505, configuring, by the network device, one K-port pilot resource, and performing beam-forming on the K-port pilot resource using the determined optimum second beam-forming vector;

Here K is the number of antenna elements in the second dimension.

Since the optimum second beam-forming vector is determined, and also since the optimum pre-coding information in the second dimension needs to be determined in this operation, and the number of antenna elements in the second dimension is K, the pilot resources need to be configured with K ports, where the optimum second beam-forming vector is applicable to the K-port pilot resource.

In the operation 506, obtaining, by the network device, the optimum pre-coding information in the second dimension according to third measurement result on the K-port.

As can be apparent from the description above, both the first beam-forming vectors and the second beam-forming vectors are beam-forming vectors in the first dimension. In an implementation, the user equipment measures on the pilot resources, beam-formed using the second beam-forming vectors in the first dimension, transmitted by the network device in the operation 505 upon reception of the pilot resources, and the measurement result is CSI.

The user equipment feeds the CSI back to the network device, and the network device determines the optimum pre-coding information in the second dimension according to PMI information in the CSI.

In the operation 507, integrating, by the network device, the optimum second beam-forming vector, and the optimum pre-coding information in the second dimension into the three-dimension beam pre-coding information.

Both the first beam-forming vectors and the second beam-forming vectors are beam-forming vectors in the first dimension, and the determined optimum second beam-forming vector in the first dimension, and optimum pre-coding information in the second dimension is integrated into the three-dimension beam pre-coding information.

Figure 5B:
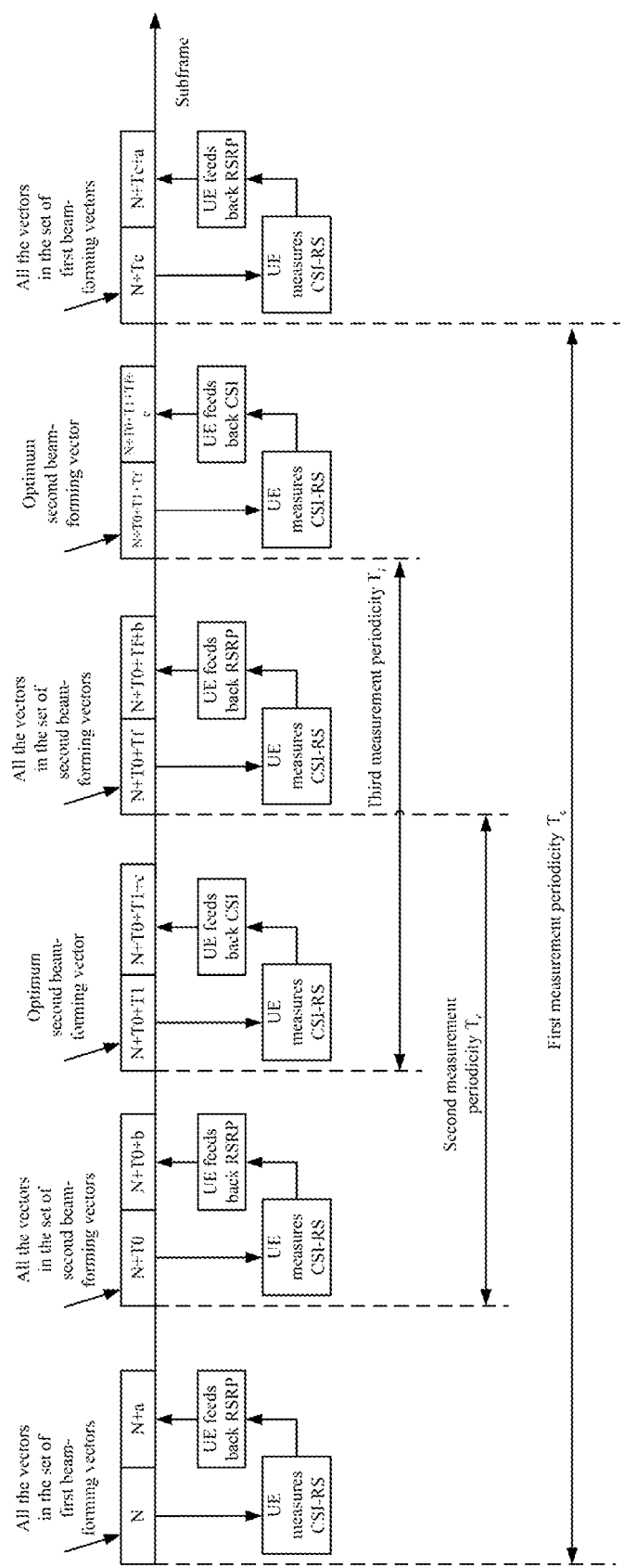
FIG. 5b is a block diagram of timing for determining three-dimension beam pre-coding information according to an embodiment of the invention.

In an implementation, since the user equipment may move, etc., the base station needs to update its own three-dimension beam pre-coding information. As illustrated in FIG. 5b which is a block diagram of timing corresponding to the flow of the method in the operations 501 to 507 above according to the embodiments of the invention, as can be apparent from FIG. 5b, the network device performs beam-forming on the pilot resources using the vectors in the set of first beam-forming vectors respectively according to a first measurement periodicity; the network device performs beam-forming on the pilot resources using the vectors in the determined set of second beam-forming vectors respectively according to a second measurement periodicity; and the network device performs beam-forming on the K-port pilot resource using the vectors in the determined optimum second beam-forming vector at a third measurement periodicity.

In an implementation, firstly the optimum first beam-forming vector, and then the optimum second beam-forming vector are determined, so the pilot is transmitted after beam-forming is performed on the pilot resources using the first beam-forming vectors, and thereafter the measurement results corresponding to the pilot may be received in a next sub-frame to a sub-frame in which the pilot is transmitted, or after several sub-frames subsequent to the transmission of the pilot; and the measurement at the second measurement periodicity will be performed in a next sub-frame to a sub-frame in which the measurement results corresponding to the pilot are fed back, and some sub-frame after the next sub-frame. Furthermore the pilot is transmitted after beam-forming is performed on the pilot resources using the second beam-forming vectors, and thereafter the measurement results corresponding to the pilot may be received in a next sub-frame to a sub-frame in which the pilot is transmitted, or after several sub-frames subsequent to the transmission of the pilot; and the measurement at the third measurement periodicity will be performed in a next sub-frame to a sub-frame in which the measurement results corresponding to the pilot are fed back, and some sub-frame after the next sub-frame.

There is a time offset of T0 sub-frames between the first measurement periodicity and the second measurement periodicity, where T0 is no less than a+1, and a is the number of sub-frames between the sub-frame in which the pilot is transmitted after beam-forming is performed on the pilot resources using the first beam-forming vectors and the sub-frame in which the corresponding measurement results are fed back; and there is a time offset of T1 sub-frames between the second measurement periodicity and the third measurement periodicity, where T1 is no less than b+1, and b is the number of sub-frames between the sub-frame in which the pilot is transmitted after beam-forming is performed on the pilot resources using the second beam-forming vectors and the sub-frame in which the corresponding measurement results are fed back.

The length of the first measurement periodicity is more than or equal to the length of the second measurement periodicity and the length of the third measurement periodicity, where the first measurement periodicity includes P second measurement periodicities and P third measurement periodicities, where P≥1; and the length of the third measurement periodicity is equal to the length of the second measurement periodicity.

Since the first measurement periodicity is used to determine the optimum first beam-forming vector, the first beam-forming vector is obtained as a result of low bit quantization on the first-dimension space, and each second beam-forming vector is obtained as a result of high bit quantization on the first-dimension space, the user equipment will not move over a long distance in a short period of time, so that simply the second measurement periodicity and the third measurement periodicity will be repeated in the short period of time, that is, the optimum second beam-forming vector, and the optimum pre-coding information in the second dimension can be determined again and again in the short period of time; and the optimum first beam-forming vector can be determined again in a long period of time. Preferably the optimum second beam-forming vector, and the optimum pre-coding information in the second dimension can be determined once or more in the first measurement periodicity, that is, the first measurement periodicity can include one or more second measurement periodicities and third measurement periodicities.

The measurement periodicities are preset for the respective measurements so that the optimum three-dimension beam-forming vectors can be updated periodically to thereby improve the performance of the system, and furthermore the first beam-forming vectors are updated less frequently, and the second beam-forming vectors, and the pre-coding information in the second-dimension are updated more frequently, to thereby achieving the effect alleviating resource consumption so as to further improve the performance of the system.

In the third implementation, firstly the optimum first beam-forming vector is determined among the N first beam-forming vectors, then the optimum second beam-forming vector is determined among the M second beam-forming vectors, and lastly the optimum pre-coding information in the second dimension is determined; and as can be apparent, there are a small number of measurement vectors in this process for the purpose of converging rapidly the optimum second beam-forming vector, and the optimum pre-coding information in the second dimension so as to prepare for rapid three-dimension beam-forming.

Figure 6:
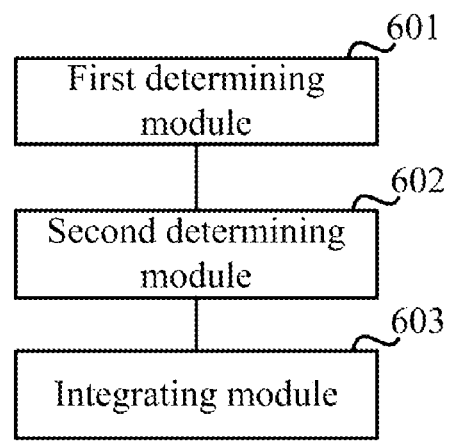
FIG. 6 is a schematic diagram of an apparatus for determining three-dimension beam pre-coding information according to an embodiment of the invention.

Based upon the same inventive idea, an embodiment of the invention provides an apparatus for determining three-dimension beam pre-coding information as illustrated in FIG. 6, which can be a base station, or a transmitter in a base station, where the apparatus includes:

A first determining module 601 is configured to perform beam-forming on pilot resources using vectors in a set of first beam-forming vectors respectively, and then transmit a pilot, to determine an optimum first beam-forming vector in the set of first beam-forming vectors according to a first measurement result on the pilot, and to determine a set of second beam-forming vectors corresponding to the optimum first beam-forming vector, where there is a set of second beam-forming vectors corresponding to each first beam-forming vector, each first beam-forming vector is obtained as a result of bit quantization on a first-dimension space of the network device, and each second beam-forming vector is obtained as a result of bit quantization on the first-dimension space of the corresponding first beam-forming vector;

A second determining module 602 is configured to perform beam-forming on the pilot resources using vectors in the determined set of second beam-forming vectors respectively, and then transmit a pilot, and to determine an optimum second beam-forming vectors in the set of second beam-forming vectors, and optimum pre-coding information in a second dimension according to a second measurement result on the pilot; and An integrating module 603 is configured to integrate the optimum second beam-forming vector, and the optimum pre-coding information in the second dimension into three-dimension beam pre-coding information.

The optimum first beam-forming vector with lower bit quantization is determined to thereby narrow rapidly a scope in which the optimum second beam-forming vector is determined, and thereafter the optimum second beam-forming vectors with higher bit quantization is determined among the second beam-forming vectors corresponding to the optimum first beam-forming vector, so that the optimum second beam-forming vector can be determined rapidly without measuring on all the beam-forming vectors.

The optimum first beam-forming vector, the optimum second beam-forming vector, and the optimum pre-coding information in the second dimension can be determined according to the embodiment of the invention in the following several implementations:

First Implementation:

The first determining module 601 configured to perform beam-forming on the pilot resources using the vectors in the set of first beam-forming vectors respectively and transmit the pilot is configured:

To configure N single-port pilot resources, and to perform beam-forming on the respective single-port pilot resources using the vectors in the set of first beam-forming vectors respectively, where there are different first beam-forming vectors applicable to the respective single-port pilot resources, and N is the number of vectors in the set of first beam-forming vectors; or To configure one N-port pilot resource, and to perform beam-forming on the N-port pilot resource using the vectors in the set of first beam-forming vectors respectively, where there are different first beam-forming vectors applicable to the respective ports of the N-port, and N is the number of vectors in the set of first beam-forming vectors; and The second determining module 602 configured to perform beam-forming on the pilot resources using the vectors in the determined set of second beam-forming vectors respectively and transmit the pilot is configured:

To configure M K-port pilot resources, and to perform beam-forming on the respective K-port pilot resources using the vectors in the set of second beam-forming vectors respectively, where there is the same second beam-forming vector applicable to each K-port pilot resource, and there are different second beam-forming vectors applicable to the M respective K-port pilot resources, where M is the number of vectors in the set of second beam-forming vectors, and K is the number of antenna elements in the second dimension.

In the first implementation, firstly the optimum first beam-forming vector is determined among the N first beam-forming vectors, and then the optimum second beam-forming vector, and the optimum pre-coding information in the second dimension is determined among the M K-port pilot resources, on which beam-forming is performed using the second beam-forming vectors. As can be apparent, there are a small number of measurement vectors in this process for the purpose of converging rapidly the optimum second beam-forming vector, and the optimum pre-coding information in the second dimension so as to prepare for rapid three-dimension beam-forming.

Second Implementation:

The first determining module 601 configured to perform beam-forming on the pilot resources using the vectors in the set of first beam-forming vectors respectively and transmit the pilot is configured:

To configure N K-port pilot resources, and to perform beam-forming on the respective K-port pilot resources using the vectors in the set of first beam-forming vectors respectively, where there is the same first beam-forming vector applicable to each K-port pilot resource, and there are different first beam-forming vectors applicable to the N respective K-port pilot resources, where N is the number of vectors in the set of first beam-forming vectors, and K is the number of antenna elements in the second dimension; and The second determining module 602 configured to perform beam-forming on the pilot resources using the vectors in the determined set of second beam-forming vectors respectively is configured:

To configure M K-port pilot resources, and to perform beam-forming on the respective K-port pilot resources using the vectors in the set of second beam-forming vectors respectively, where there is the same second beam-forming vector applicable to the each K-port pilot resource, and there are different second beam-forming vectors applicable to the M respective K-port pilot resources, where M is the number of vectors in the set of second beam-forming vectors, and K is the number of antenna elements in the second dimension.

In the second implementation, firstly the optimum first beam-forming vector is determined among the N K-port pilot resources on which beam-forming is performed using the first beam-forming vectors, and then the optimum second beam-forming vector, and the optimum pre-coding information in the second dimension is determined among the M K-port pilot resources on which beam-forming is performed using the second beam-forming vectors; and as can be apparent, there are a small number of measurement vectors in this process for the purpose of converging rapidly the optimum second beam-forming vector, and the optimum pre-coding information in the second dimension so as to prepare for rapid three-dimension beam-forming.

There are the following features common to the first implementation and the second implementation:

The first determining module 601 is configured:

To perform beam-forming on the pilot resources using the vectors in the set of first beam-forming vectors respectively according to a first measurement periodicity; and The second determining module 602 is configured:

To perform beam-forming on the pilot resources using the vectors in the set of second beam-forming vectors respectively according to a second measurement periodicity;

Here there is a time offset of T0 sub-frames between the first measurement periodicity and the second measurement periodicity, where T0 is no less than a+1, and a is the number of sub-frames between a sub-frame in which the pilot is transmitted after beam-forming is performed on the pilot resources using the first beam-forming vectors and a sub-frame in which the corresponding measurement results are fed back; and the length of the first measurement periodicity is more than or equal to the length of the second measurement periodicity, where the first measurement periodicity includes P second measurement periodicities, where P≥1.

The measurement periodicities are preset for the respective measurements so that the optimum three-dimension beam-forming vector can be updated periodically to thereby improve the performance of the system, and furthermore the first beam-forming vectors are updated less frequently, and the second beam-forming vectors, and the pre-coding information in the second-dimension are updated more frequently, to thereby achieving the effect alleviating resource consumption so as to further improve the performance of the system.

Third Implementation:

The first determining module 601 configured to perform beam-forming on the pilot resources using the vectors in the set of first beam-forming vectors respectively and transmit the pilot is configured:

To configure N single-port pilot resources, and to perform beam-forming on the respective single-port pilot resources using the vectors in the set of first beam-forming vectors respectively, where there are different first beam-forming vectors applicable to the respective single-port pilot resources, and N is the number of vectors in the set of first beam-forming vectors; or To configure one N-port pilot resource, and to perform beam-forming on the N-port pilot resource using the vectors in the set of first beam-forming vectors respectively, where there are different first beam-forming vectors applicable to the respective ports of the N-port, and N is the number of vectors in the set of first beam-forming vectors;

The second determining module 602 configured to perform beam-forming on the pilot resources using the vectors in the determined set of second beam-forming vectors respectively is configured:

To configure one M-port pilot resource, and to perform beam-forming on each port pilot resource using the vectors in the set of second beam-forming vectors respectively, where there are different second beam-forming vectors applicable to the respective ports of the M-port, and M is the number of vectors in the set of second beam-forming vectors; or To configure M single-port pilot resources, and to perform beam-forming on the respective single-port pilot resources using the vectors in the set of second beam-forming vectors respectively, where there are different second beam-forming vectors applicable to the respective single-port pilot resources, and M is the number of vectors in the set of second beam-forming vectors; and The second determining module 602 configured to perform beam-forming on the pilot resources using the vectors in the determined set of second beam-forming vectors respectively, and then transmit the pilot is further configured:

To configure one K-port pilot resource, and to perform beam-forming on the K-port pilot resource using the determined optimum second beam-forming vector, where K is the number of antenna elements in the second dimension; and To obtain the pre-coding information in the second dimension according to third measurement result on the K-port.

There are the following features in the third implementation:

The first determining module 601 is configured:

To perform beam-forming on the pilot resources using the vectors in the set of first beam-forming vectors respectively according to a first measurement periodicity;

The second determining module 602 is configured:

To perform beam-forming on the pilot resources using the vectors in the determined set of second beam-forming vectors respectively according to a second measurement periodicity; and The second determining module 602 is further configured:

To perform beam-forming on the K-port pilot resource using the determined optimum second beam-forming vector according to a third measurement periodicity;

Here there is a time offset of T0 sub-frames between the first measurement periodicity and the second measurement periodicity, where T0 is no less than a+1, and a is the number of sub-frames between a sub-frame in which the pilot is transmitted after beam-forming is performed on the pilot resources using the first beam-forming vectors and a sub-frame in which the corresponding measurement results are fed back; there is a time offset of T1 sub-frames between the second measurement periodicity and the third measurement periodicity, where T1 is no less than b+1, and b is the number of sub-frames between a sub-frame in which the pilot is transmitted after beam-forming is performed on the pilot resources using the second beam-forming vectors and a sub-frame in which the corresponding measurement results are fed back; the length of the first measurement periodicity is more than or equal to the length of the second measurement periodicity and the length of the third measurement periodicity, where the first measurement periodicity includes P second measurement periodicities and P third measurement periodicities, where P≥1; and the length of the third measurement periodicity is equal to the length of the second measurement periodicity.

The measurement periodicities are preset for the respective measurements so that the optimum three-dimension beam-forming vector can be updated periodically to thereby improve the performance of the system, and furthermore the first beam-forming vectors are updated less frequently, and the second beam-forming vectors, and the pre-coding information in the second-dimension are updated more frequently, to thereby achieving the effect alleviating resource consumption so as to further improve the performance of the system.

In an embodiment of the invention, the pilot is a Channel State Information-Reference Signal (CSI-RS), and the first measurement result and the second measurement result are Reference Signal Received Power (RSRP) or Channel State Information (CSI).

In an embodiment of the invention, the first dimension is the vertical dimension, and the second dimension is the horizontal dimension; or the first dimension is the horizontal dimension, and the second dimension is the vertical dimension.

In the third implementation, firstly the optimum first beam-forming vector is determined among the N first beam-forming vectors, then the optimum second beam-forming vector is determined among the M second beam-forming vectors, and lastly the optimum pre-coding information in the second dimension is determined; and as can be apparent, there are a small number of measurement vectors in this process for the purpose of converging rapidly the optimum second beam-forming vector, and the optimum pre-coding information in the second dimension so as to prepare for rapid three-dimension beam-forming.

Figure 7:
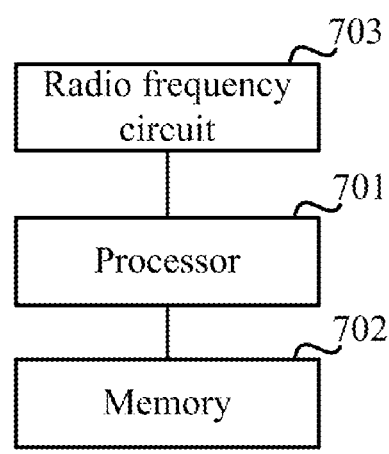
FIG. 7 is a schematic diagram of an apparatus for determining three-dimension beam pre-coding information according to an embodiment of the invention.

Based upon the same inventive idea, an embodiment of the invention provides an apparatus for determining three-dimension beam pre-coding information as illustrated in FIG. 7, which can be a base station, or a transmitter in a base station, where the apparatus includes a processor 701 and a memory 702, and further a radio frequency circuit 703, where:

The processor 701 is configured to perform beam-forming on pilot resources using vectors in a set of first beam-forming vectors respectively, and then transmit a pilot, to determine an optimum first beam-forming vector in the set of first beam-forming vectors according to a first measurement result on the pilot, and to determine a set of second beam-forming vectors corresponding to the optimum first beam-forming vector, where there is a set of second beam-forming vectors corresponding to each first beam-forming vector, each first beam-forming vector is obtained as a result of bit quantization on a first-dimension space of the network device, and each second beam-forming vector is obtained as a result of bit quantization on the first-dimension space of the corresponding first beam-forming vector; to perform beam-forming on the pilot resources using vectors in the determined set of second beam-forming vectors respectively, and then transmit a pilot, and to determine an optimum second beam-forming vector in the set of second beam-forming vectors, and optimum pre-coding information in a second dimension according to a second measurement result on the pilot; and to integrate the optimum second beam-forming vector, and the optimum pre-coding information in the second dimension into three-dimension beam pre-coding information;

The memory 702 is configured to store all the first beam-forming vectors, the second beam-forming vectors, the pre-coding information in the second dimension, and the measurement results fed back by a user equipment; and The radio frequency circuit 703 is configured to transmit the pilot.

The optimum first beam-forming vector with lower bit quantization is determined to thereby narrow rapidly a scope in which the optimum first beam-forming vector is determined, and thereafter the optimum second beam-forming vector with higher bit quantization is determined among the second beam-forming vectors corresponding to the optimum first beam-forming vector, so that the optimum second beam-forming vector can be determined rapidly without measuring on all the beam-forming vectors.

The optimum first beam-forming vector, the optimum second beam-forming vector, and the optimum pre-coding information in the second dimension can be determined according to the embodiment of the invention in the following three implementations:

First Implementation:

The processor 701 configured to perform beam-forming on the pilot resources using the vectors in the set of first beam-forming vectors respectively and transmit the pilot is configured:

To configure N single-port pilot resources, and to perform beam-forming on the respective single-port pilot resources using the vectors in the set of first beam-forming vectors respectively, where there are different first beam-forming vectors applicable to the respective single-port pilot resources, and N is the number of vectors in the set of first beam-forming vectors; or To configure one N-port pilot resource, and to perform beam-forming on the N-port pilot resource using the vectors in the set of first beam-forming vectors respectively, where there are different first beam-forming vectors applicable to the respective ports of the N-port, and N is the number of vectors in the set of first beam-forming vectors; and The processor 701 configured to perform beam-forming on the pilot resources using the vectors in the determined set of second beam-forming vectors respectively and transmit the pilot is configured:

To configure M K-port pilot resources, and to perform beam-forming on the respective K-port pilot resources using the vectors in the set of second beam-forming vectors respectively, where there is the same second beam-forming vector applicable to each K-port pilot resource, and there are different second beam-forming vectors applicable to the M respective K-port pilot resources, where M is the number of vectors in the set of second beam-forming vectors, and K is the number of antenna elements in the second dimension.

In the first implementation, firstly the optimum first beam-forming vector is determined among the N first beam-forming vectors, and then the optimum second beam-forming vector, and the optimum pre-coding information in the second dimension is determined among the M K-port pilot resources, on which beam-forming is performed using the second beam-forming vectors. As can be apparent, there are a small number of measurement vectors in this process for the purpose of converging rapidly the optimum second beam-forming vector, and the optimum pre-coding information in the second dimension so as to prepare for rapid three-dimension beam-forming.

Second Implementation:

The processor 701 configured to perform beam-forming on the pilot resources using the vectors in the set of first beam-forming vectors respectively and transmit the pilot is configured:

To configure N K-port pilot resources, and to perform beam-forming on the respective K-port pilot resources using the vectors in the set of first beam-forming vectors respectively, where there is the same first beam-forming vector applicable to each K-port pilot resource, and there are different first beam-forming vectors applicable to the N respective K-port pilot resources, where N is the number of vectors in the set of first beam-forming vectors, and K is the number of antenna elements in the second dimension; and The processor 701 configured to perform beam-forming on the pilot resources using the vectors in the determined set of second beam-forming vectors respectively and transmit the pilot is configured:

To configure M K-port pilot resources, and to perform beam-forming on the respective K-port pilot resources using the vectors in the set of second beam-forming vectors respectively, where there is the same second beam-forming vector applicable to each K-port pilot resource, and there are different second beam-forming vectors applicable to the M respective K-port pilot resources, where M is the number of vectors in the set of second beam-forming vectors, and K is the number of antenna elements in the second dimension.

In the second implementation, firstly the optimum first beam-forming vector is determined among the N K-port pilot resources on which beam-forming is performed using the first beam-forming vectors, and then the optimum second beam-forming vector, and the optimum pre-coding information in the second dimension is determined among the M K-port pilot resources on which beam-forming is performed using the second beam-forming vectors; and as can be apparent, there are a small number of measurement vectors in this process for the purpose of converging rapidly the optimum second beam-forming vector, and the optimum pre-coding information in the second dimension so as to prepare for rapid three-dimension beam-forming.

There are the following features common to the first implementation and the second implementation:

The processor 701 is configured:

To perform beam-forming on the pilot resources using the vectors in the set of first beam-forming vectors respectively according to a first measurement periodicity; and The processor 701 is configured:

To perform beam-forming on the pilot resources using the vectors in the set of second beam-forming vectors respectively according to a second measurement periodicity;

Here there is a time offset of T0 sub-frames between the first measurement periodicity and the second measurement periodicity, where T0 is no less than a+1, and a is the number of sub-frames between a sub-frame in which the pilot is transmitted after beam-forming is performed on the pilot resources using the first beam-forming vectors and a sub-frame in which the corresponding measurement results are fed back; and the length of the first measurement periodicity is more than or equal to the length of the second measurement periodicity, where the first measurement periodicity includes P second measurement periodicities, where P≥1.

The measurement periodicities are preset for the respective measurements so that the optimum three-dimension beam-forming vector can be updated periodically to thereby improve the performance of the system, and furthermore the first beam-forming vectors are updated less frequently, and the second beam-forming vectors, and the pre-coding information in the second-dimension are updated more frequently, to thereby achieving the effect alleviating resource consumption so as to further improve the performance of the system.

Third Implementation:

The processor 701 configured to perform beam-forming on the pilot resources using the vectors in the set of first beam-forming vectors respectively and transmit the pilot is configured:

To configure N single-port pilot resources, and to perform beam-forming on the respective single-port pilot resources using the vectors in the set of first beam-forming vectors respectively, where there are different first beam-forming vectors applicable to the respective single-port pilot resources, and N is the number of vectors in the set of first beam-forming vectors; or To configure one N-port pilot resource, and to perform beam-forming on the N-port pilot resource using the vectors in the set of first beam-forming vectors respectively, where there are different first beam-forming vectors applicable to the respective ports of the N-port, and N is the number of vectors in the set of first beam-forming vectors;

The processor 701 configured to perform beam-forming on the pilot resources using the vectors in the determined set of second beam-forming vectors respectively and transmit the pilot is configured:

To configure one M-port pilot resource, and to perform beam-forming on each port pilot resource using the vectors in the set of second beam-forming vectors respectively, where there are different second beam-forming vectors applicable to the respective M-port pilot resource, and M is the number of vectors in the set of second beam-forming vectors; or To configure M single-port pilot resources, and to perform beam-forming on the respective single-port pilot resources using the vectors in the set of second beam-forming vectors respectively, where there are different second beam-forming vectors applicable to the respective single-port pilot resources, and M is the number of vectors in the set of second beam-forming vectors; and The processor 701 configured to perform beam-forming on the pilot resources using the vectors in the determined set of second beam-forming vectors respectively, and then transmit the pilot is further configured:

To configure one K-port pilot resource, and to perform beam-forming on the K-port pilot resource using the determined optimum second beam-forming vector, where K is the number of antenna elements in the second dimension; and To obtain the pre-coding information in the second dimension according to a third measurement result on the K-port.

There are the following features in the third implementation:

The processor 701 is configured:

To perform beam-forming on the pilot resources using the vectors in the set of first beam-forming vectors respectively according to a first measurement periodicity;

The processor 701 is configured:

To perform beam-forming on the pilot resources using the vectors in the determined set of second beam-forming vectors respectively according to a second measurement periodicity; and The processor 701 is further configured:

To perform beam-forming on the K-port pilot resource using the determined optimum second beam-forming vector according to a third measurement periodicity;

Here there is a time offset of T0 sub-frames between the first measurement periodicity and the second measurement periodicity, where T0 is no less than a+1, and a is the number of sub-frames between a sub-frame in which the pilot is transmitted after beam-forming is performed on the pilot resources using the first beam-forming vectors and a sub-frame in which the corresponding measurement results are fed back; there is a time offset of T1 sub-frames between the second measurement periodicity and the third measurement periodicity, where T1 is no less than b+1, and b is the number of sub-frames between a sub-frame in which the pilot is transmitted after beam-forming is performed on the pilot resources using the second beam-forming vectors and a sub-frame in which the corresponding measurement results are fed back; the length of the first measurement periodicity is more than or equal to the length of the second measurement periodicity and the length of the third measurement periodicity, where the first measurement periodicity includes P second measurement periodicities and P third measurement periodicities, where P≥1; and the length of the third measurement periodicity is equal to the length of the second measurement periodicity.

The measurement periodicities are preset for the respective measurements so that the optimum three-dimension beam-forming vector can be updated periodically to thereby improve the performance of the system, and furthermore the first beam-forming vectors are updated less frequently, and the second beam-forming vectors, and the pre-coding information in the second-dimension are updated more frequently, to thereby achieving the effect alleviating resource consumption so as to further improve the performance of the system.

In an embodiment of the invention, the pilot is a Channel State Information-Reference Signal (CSI-RS), and the first measurement result and the second measurement result are Reference Signal Received Power (RSRP) or Channel State Information (CSI).

In an embodiment of the invention, the first dimension is the vertical dimension, and the second dimension is the horizontal dimension; or the first dimension is the horizontal dimension, and the second dimension is the vertical dimension.

In the third implementation, firstly the optimum first beam-forming vector is determined among the N first beam-forming vectors, then the optimum second beam-forming vector is determined among the M second beam-forming vectors, and lastly the optimum pre-coding information in the second dimension is determined; and as can be apparent, there are a small number of measurement vectors in this process for the purpose of converging rapidly the optimum second beam-forming vector, and the optimum pre-coding information in the second dimension so as to prepare for rapid three-dimension beam-forming.

As can be apparent from the description above, in the embodiments of the invention, there is a set of first beam-forming vectors in the first dimension, and there is a set of second beam-forming vectors corresponding to each first beam-forming vector, where each first beam-forming vector is obtained as a result of bit quantization on the first-dimension space of the network device, and each second beam-forming vector is obtained as a result of bit quantization on the first-dimension space of the corresponding first beam-forming vector, that is, the first beam-forming vector is such a beam-forming vector with a coarse granularity that is obtained as a result of low bit quantization on the first-dimension space of the network device, and the second beam-forming vector is such a beam-forming vector with a fine granularity that is obtained as a result of high bit quantization on the first-dimension space of the network device. The third-dimension beam pre-coding information is determined in such a way that the network device firstly performs beam-forming using the elements in the set of first beam-forming vectors, and determines the optimum first beam-forming vector according to the feedback of the user equipment; then performs beam-forming using the elements in the set of second beam-forming vectors corresponding to the optimum first beam-forming vector, and determines the optimum second beam-forming vector, and the optimum pre-coding information in the second dimension based upon the feedback of the user equipment; and further integrates the optimum second beam-forming vector, and the optimum pre-coding information in the second dimension into the third-dimension beam pre-coding information. Firstly the optimum beam-forming vector is determined among the set of beam-forming vectors with the coarse granularity, and then the optimum beam-forming vector is determined among the corresponding set of beam-forming vectors with the fine granularity, so that the optimum beam-forming vector at the fine granularity, and the optimum pre-coding information are determined without measuring on all the beam-forming vectors with the fine granularity to thereby alleviate a resource overhead of the system, and further lower the complexity of the user equipment, as compared with the prior art.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining three-dimension beam pre-coding information, the method comprising:

performing, by a network device, beam-forming on pilot resources using vectors in a set of first beam-forming vectors respectively, and then transmitting a pilot, determining an optimum first beam-forming vector in the set of first beam-forming vectors according to a first measurement result on the pilot, and determining a set of second beam-forming vectors corresponding to the optimum first beam-forming vector, wherein there is a set of second beam-forming vectors corresponding to each first beam-forming vector, each first beam-forming vector is obtained as a result of bit quantization on a first-dimension space of the network device, and each second beam-forming vector is obtained as a result of bit quantization on a first-dimension space of a corresponding first beam-forming vector;

performing, by the network device, beam-forming on the pilot resources using vectors in the determined set of second beam-forming vectors respectively, and then transmitting a pilot, and determining an optimum second beam-forming vector in the set of second beam-forming vectors, and optimum pre-coding information in a second dimension according to a second measurement result on the pilot; and integrating, by the network device, the optimum second beam-forming vector, and the optimum pre-coding information in the second dimension into three-dimension beam pre-coding information.

2. The method according to claim 1, wherein performing, by the network device, beam-forming on the pilot resources using the vectors in the set of first beam-forming vectors respectively comprises:

configuring, by the network device, N single-port pilot resources, and performing beam-forming on the respective single-port pilot resources using the vectors in the set of first beam-forming vectors respectively, wherein there are different first beam-forming vectors applicable to the respective single-port pilot resources, and N is a number of vectors in the set of first beam-forming vectors; or configuring, by the network device, one N-port pilot resource, and performing beam-forming on the N-port pilot resource using the vectors in the set of first beam-forming vectors respectively, wherein there are different first beam-forming vectors applicable to the respective ports of the N-port, and N is the number of vectors in the set of first beam-forming vectors; and performing, by the network device, beam-forming on the pilot resources using the vectors in the determined set of second beam-forming vectors respectively comprises:

configuring, by the network device, M K-port pilot resources, and performing beam-forming on the respective K-port pilot resources using the vectors in the set of second beam-forming vectors respectively, wherein there is a same second beam-forming vector applicable to each K-port pilot resource, and there are different second beam-forming vectors applicable to the M respective K-port pilot resources, wherein M is a number of vectors in the set of second beam-forming vectors, and K is a number of antenna elements in the second dimension.

3. The method according to claim 1, wherein performing, by the network device, beam-forming on the pilot resources using the vectors in the set of first beam-forming vectors respectively comprises:

configuring, by the network device, N K-port pilot resources, and performing beam-forming on the respective K-port pilot resources using the vectors in the set of first beam-forming vectors respectively, wherein there is a same first beam-forming vector applicable to each K-port pilot resource, and there are different first beam-forming vectors applicable to the N respective K-port pilot resources, wherein N is a number of vectors in the set of first beam-forming vectors, and K is a number of antenna elements in the second dimension; and performing, by the network device, beam-forming on the pilot resources using the vectors in the determined set of second beam-forming vectors respectively comprises:

configuring, by the network device, M K-port pilot resources, and performing beam-forming on the respective K-port pilot resources using the vectors in the set of second beam-forming vectors respectively, wherein there is a same second beam-forming vector applicable to each K-port pilot resource, and there are different second beam-forming vectors applicable to the M respective K-port pilot resources, wherein M is a number of vectors in the set of second beam-forming vectors, and K is the number of antenna elements in the second dimension.

4. The method according to claim 2, wherein the network device performs beam-forming on the pilot resources using the vectors in the set of first beam-forming vectors respectively according to a first measurement periodicity; and the network device performs beam-forming on the pilot resources using the vectors in the set of second beam-forming vectors respectively according to a second measurement periodicity;

where there is a time offset of T0 sub-frames between the first measurement periodicity and the second measurement periodicity, wherein T0 is no less than a+1, and a is a number of sub-frames between a sub-frame in which the pilot is transmitted after beam-forming is performed on the pilot resources using the first beam-forming vectors and a sub-frame in which corresponding measurement results are fed back; and the first measurement periodicity comprises P second measurement periodicities, wherein P≥1.

5. The method according to claim 1, wherein performing, by the network device, beam-forming on the pilot resources using the vectors in the set of first beam-forming vectors respectively comprises:

configuring, by the network device, N single-port pilot resources, and performing beam-forming on the respective single-port pilot resources using the vectors in the set of first beam-forming vectors respectively, wherein there are different first beam-forming vectors applicable to the respective single-port pilot resources, and N is a number of vectors in the set of first beam-forming vectors; or configuring, by the network device, one N-port pilot resource, and performing beam-forming on the N-port pilot resource using the vectors in the set of first beam-forming vectors respectively, wherein there are different first beam-forming vectors applicable to the respective ports of the N-port, and N is the number of vectors in the set of first beam-forming vectors;

performing, by the network device, beam-forming on the pilot resources using the vectors in the determined set of second beam-forming vectors respectively comprises:

configuring, by the network device, one M-port pilot resource, and performing beam-forming on each port pilot resource using the vectors in the set of second beam-forming vectors respectively, wherein there are different second beam-forming vectors applicable to the respective ports of the M-port, and M is a number of vectors in the set of second beam-forming vectors; or configuring, by the network device, M single-port pilot resources, and performing beam-forming on the respective single-port pilot resources using the vectors in the set of second beam-forming vectors respectively, wherein there are different second beam-forming vectors applicable to the respective single-port pilot resources, and M is the number of vectors in the set of second beam-forming vectors; and after the network device determines the optimum second beam-forming vector in the set of second beam-forming vectors according to the second measurement result on the pilot, the method further comprises:

configuring, by the network device, one K-port pilot resource, and performing beam-forming on the K-port pilot resource using the determined optimum second beam-forming vector, wherein K is a number of antenna elements in the second dimension; and obtaining, by the network device, the optimum pre-coding information in the second dimension according to a third measurement result on the K-port.

6. The method according to claim 5, wherein the network device performs beam-forming on the pilot resources using the vectors in the set of first beam-forming vectors respectively according to a first measurement periodicity;

the network device performs beam-forming on the pilot resources using the vectors in the determined set of second beam-forming vectors respectively according to a second measurement periodicity; and the network device performs beam-forming on the K-port pilot resource using the determined optimum second beam-forming vector according to a third measurement periodicity;

wherein there is a time offset of T0 sub-frames between the first measurement periodicity and the second measurement periodicity, wherein T0 is no less than a+1, and a is a number of sub-frames between a sub-frame in which the pilot is transmitted after beam-forming is performed on the pilot resources using the first beam-forming vectors and a sub-frame in which corresponding measurement results are fed back; there is a time offset of T1 sub-frames between the second measurement periodicity and the third measurement periodicity, wherein T1 is no less than b+1, and b is a number of sub-frames between a sub-frame in which the pilot is transmitted after beam-forming is performed on the pilot resources using the second beam-forming vectors and a sub-frame in which corresponding measurement results are fed back; the first measurement periodicity comprises P second measurement periodicities and P third measurement periodicities, wherein P≥1; and a length of the third measurement periodicity is equal to a length of the second measurement periodicity.

7. The method according to claim 1, wherein the pilot is a Channel State Information-Reference Signal (CSI-RS), and the first measurement result and the second measurement result are Reference Signal Received Power (RSRP) or Channel State Information (CSI).

8. The method according to claim 1, wherein the first dimension is a vertical dimension, and the second dimension is a horizontal dimension; or the first dimension is the horizontal dimension, and the second dimension is the vertical dimension.

9. An apparatus for determining three-dimension beam pre-coding information, the apparatus comprising:
   a processor;
   a memory; and
   a radio frequency circuit;
   wherein
   the processor is configured to perform beam-forming on pilot resources using vectors in a set of first beam-forming vectors respectively, and then transmit a pilot, to determine an optimum first beam-forming vector in the set of first beam-forming vectors according to a first measurement result on the pilot, and to determine a set of second beam-forming vectors corresponding to the optimum first beam-forming vector, wherein there is a set of second beam-forming vectors corresponding to each first beam-forming vector, each first beam-forming vector is obtained as a result of bit quantization on a first-dimension space of the network device, and each second beam-forming vector is obtained as a result of bit quantization on the first-dimension space of a corresponding first beam-forming vector;
   to perform beam-forming on the pilot resources using vectors in the determined set of second beam-forming vectors respectively, and then transmit a pilot, and to determine an optimum second beam-forming vector in the set of second beam-forming vectors, and optimum pre-coding information in a second dimension according to a second measurement result on the pilot; and
   to integrate the optimum second beam-forming vector, and the optimum pre-coding information in the second dimension into three-dimension beam pre-coding information;
   the memory is configured to store all the first beam-forming vectors, the second beam-forming vectors, the pre-coding information in the second dimension, and the measurement results fed back by a user equipment; and
   the radio frequency circuit is configured to transmit the pilot.

10. The apparatus according to claim 9, wherein:
   the processor configured to perform beam-forming on the pilot resources using the vectors in the set of first beam-forming vectors respectively and transmit the pilot is configured:
   to configure N single-port pilot resources, and to perform beam-forming on the respective single-port pilot resources using the vectors in the set of first beam-forming vectors respectively, wherein there are different first beam-forming vectors applicable to the respective single-port pilot resources, and N is a number of vectors in the set of first beam-forming vectors; or
   to configure one N-port pilot resource, and to perform beam-forming on the N-port pilot resource using the vectors in the set of first beam-forming vectors respectively, wherein there are different first beam-forming vectors applicable to the respective ports of the N-port, and N is the number of vectors in the set of first beam-forming vectors; and
   the processor configured to perform beam-forming on the pilot resources using the vectors in the determined set of second beam-forming vectors respectively and transmit the pilot is configured:
   to configure M K-port pilot resources, and to perform beam-forming on the respective K-port pilot resources using the vectors in the set of second beam-forming vectors respectively, wherein there is a same second beam-forming vector applicable to the each K-port pilot resource, and there are different second beam-forming vectors applicable to the M respective K-port pilot resources, wherein M is a number of vectors in the set of second beam-forming vectors, and K is a number of antenna elements in the second dimension.

11. The apparatus according to claim 9, wherein:
   the processor configured to perform beam-forming on the pilot resources using the vectors in the set of first beam-forming vectors respectively and transmit the pilot is configured:
   to configure N K-port pilot resources, and to perform beam-forming on the respective K-port pilot resources using the vectors in the set of first beam-forming vectors respectively, wherein there is a same first beam-forming vector applicable to the each K-port pilot resource, and there are different first beam-forming vectors applicable to the N respective K-port pilot resources, wherein N is a number of vectors in the set of first beam-forming vectors, and K is a number of antenna elements in the second dimension; and
   the processor configured to perform beam-forming on the pilot resources using the vectors in the determined set of second beam-forming vectors respectively and transmit the pilot is configured:
   to configure M K-port pilot resources, and to perform beam-forming on the respective K-port pilot resources using the vectors in the set of second beam-forming vectors respectively, wherein there is a same second beam-forming vector applicable to the each K-port pilot resource, and there are different second beam-forming vectors applicable to the M respective K-port pilot resources, wherein M is a number of vectors in the set of second beam-forming vectors, and K is the number of antenna elements in the second dimension.

12. The apparatus according to claim 10, wherein:
   the processor is configured:
   to perform beam-forming on the pilot resources using the vectors in the set of first beam-forming vectors respectively according to a first measurement periodicity; and
   to perform beam-forming on the pilot resources using the vectors in the set of second beam-forming vectors respectively according to a second measurement periodicity;
   wherein there is a time offset of T0 sub-frames between the first measurement periodicity and the second measurement periodicity, wherein T0 is no less than a+1, and a is a number of sub-frames between a sub-frame in which the pilot is transmitted after beam-forming is performed on the pilot resources using the first beam-forming vectors and a sub-frame in which corresponding measurement results are fed back; and the first measurement periodicity comprises P second measurement periodicities, wherein P≥1.

13. The apparatus according to claim 9, wherein:
the processor configured to perform beam-forming on the pilot resources using the vectors in the set of first beam-forming vectors respectively and transmit the pilot is configured:
to configure N single-port pilot resources, and to perform beam-forming on the respective single-port pilot resources using the vectors in the set of first beam-forming vectors respectively, wherein there are different first beam-forming vectors applicable to the respective single-port pilot resources, and N is a number of vectors in the set of first beam-forming vectors; or
to configure one N-port pilot resource, and to perform beam-forming on the N-port pilot resource using the vectors in the set of first beam-forming vectors respectively, wherein there are different first beam-forming vectors applicable to the respective ports of the N-port, and N is the number of vectors in the set of first beam-forming vectors;
the processor configured to perform beam-forming on the pilot resources using the vectors in the determined set of second beam-forming vectors respectively and transmit the pilot is configured:
to configure one M-port pilot resource, and to perform beam-forming on each port pilot resource using the vectors in the set of second beam-forming vectors respectively, wherein there are different second beam-forming vectors applicable to the respective ports of the M-port, and M is a number of vectors in the set of second beam-forming vectors; or
to configure M single-port pilot resources, and to perform beam-forming on the respective single-port pilot resources using the vectors in the set of second beam-forming vectors respectively, wherein there are different second beam-forming vectors applicable to the respective single-port pilot resources, and M is the number of vectors in the set of second beam-forming vectors; and
the processor configured to perform beam-forming on the pilot resources using the vectors in the determined set of second beam-forming vectors respectively, and then transmit the pilot is further configured:
to configure one K-port pilot resource, and to perform beam-forming on the K-port pilot resource using the determined optimum second beam-forming vector, wherein K is a number of antenna elements in the second dimension; and
to obtain the optimum pre-coding information in the second dimension according to a third measurement result on the K-port.

14. The apparatus according to claim 13, wherein:
the processor is configured:
to perform beam-forming on the pilot resources using the vectors in the set of first beam-forming vectors respectively according to a first measurement periodicity;
to perform beam-forming on the pilot resources using the vectors in the determined set of second beam-forming vectors respectively according to a second measurement periodicity; and
to perform beam-forming on the K-port pilot resource using the determined optimum second beam-forming vector according to a third measurement periodicity;
wherein there is a time offset of T0 sub-frames between the first measurement periodicity and the second measurement periodicity, wherein T0 is no less than a+1, and a is a number of sub-frames between a sub-frame in which the pilot is transmitted after beam-forming is performed on the pilot resources using the first beam-forming vectors and a sub-frame in which corresponding measurement results are fed back; there is a time offset of T1 sub-frames between the second measurement periodicity and the third measurement periodicity, wherein T1 is no less than b+1, and b is a number of sub-frames between a sub-frame in which the pilot is transmitted after beam-forming is performed on the pilot resources using the second beam-forming vectors and a sub-frame in which corresponding measurement results are fed back; the first measurement periodicity comprises P second measurement periodicities and P third measurement periodicities, wherein P≥1; and a length of the third measurement periodicity is equal to a length of the second measurement periodicity.

15. The apparatus according to claim 9, wherein the pilot is a Channel State Information-Reference Signal (CSI-RS), and the first measurement result and the second measurement result are Reference Signal Received Power (RSRP) or Channel State Information (CSI).

16. The apparatus according to claim 9, wherein the first dimension is a vertical dimension, and the second dimension is a horizontal dimension; or the first dimension is the horizontal dimension, and the second dimension is the vertical dimension.

17. The method according to claim 3, wherein the network device performs beam-forming on the pilot resources using the vectors in the set of first beam-forming vectors respectively according to a first measurement periodicity; and
the network device performs beam-forming on the pilot resources using the vectors in the set of second beam-forming vectors respectively according to a second measurement periodicity;
where there is a time offset of T0 sub-frames between the first measurement periodicity and the second measurement periodicity, wherein T0 is no less than a+1, and a is a number of sub-frames between a sub-frame in which the pilot is transmitted after beam-forming is performed on the pilot resources using the first beam-forming vectors and a sub-frame in which corresponding measurement results are fed back; and the first measurement periodicity comprises P second measurement periodicities, wherein P≥1.

18. The apparatus according to claim 11, wherein:
the processor is configured:
to perform beam-forming on the pilot resources using the vectors in the set of first beam-forming vectors respectively according to a first measurement periodicity; and
to perform beam-forming on the pilot resources using the vectors in the set of second beam-forming vectors respectively according to a second measurement periodicity;
wherein there is a time offset of T0 sub-frames between the first measurement periodicity and the second measurement periodicity, wherein T0 is no less than a+1, and a is a number of sub-frames between a sub-frame in which the pilot is transmitted after beam-forming is performed on the pilot resources using the first beam-forming vectors and a sub-frame in which corresponding measurement results are fed back; and the first measurement periodicity comprises P second measurement periodicities, wherein $P \geq 1$.

* * * * *